United States Patent
Grenier et al.

(10) Patent No.: US 10,800,521 B1
(45) Date of Patent: Oct. 13, 2020

(54) CONFIGURABLE AERIAL VEHICLES

(71) Applicant: Amazon Technologies, Inc., Seattle, WA (US)

(72) Inventors: Taylor David Grenier, Seattle, WA (US); Gur Kimchi, Bellevue, WA (US); Louis LeRoi LeGrand, III, Seattle, WA (US); Ricky Dean Welsh, Seattle, WA (US); Richard Philip Whitlock, Seattle, WA (US); Dominic Timothy Shiosaki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 812 days.

(21) Appl. No.: 15/362,557

(22) Filed: Nov. 28, 2016

(51) Int. Cl.
| | |
|---|---|
| *B64C 29/00* | (2006.01) |
| *B64C 27/20* | (2006.01) |
| *B64C 29/02* | (2006.01) |
| *B64C 39/02* | (2006.01) |
| *B64C 27/50* | (2006.01) |
| *B64C 1/06* | (2006.01) |

(52) U.S. Cl.
CPC .......... *B64C 29/0033* (2013.01); *B64C 27/20* (2013.01); *B64C 29/02* (2013.01); *B64C 39/024* (2013.01); *B64C 1/063* (2013.01); *B64C 27/50* (2013.01); *B64C 2201/042* (2013.01); *B64C 2201/108* (2013.01); *B64C 2201/162* (2013.01)

(58) Field of Classification Search
CPC ......... B64C 29/02; B64C 27/20; B64C 27/28; B64C 27/30; B64C 27/50; B64C 39/008; B64C 3/546; B64C 1/063; B64C 1/28; B64C 1/30
See application file for complete search history.

(56) References Cited

U.S. PATENT DOCUMENTS

| | | | |
|---|---|---|---|
| 2003/0094537 A1* | 5/2003 | Austen-Brown | B64C 27/28 244/7 R |
| 2009/0008499 A1* | 1/2009 | Shaw | B64C 27/20 244/17.23 |
| 2014/0313332 A1* | 10/2014 | Sabe | H04N 5/23293 348/144 |

(Continued)

FOREIGN PATENT DOCUMENTS

| | | | | |
|---|---|---|---|---|
| CN | 105947202 A | * | 9/2016 | B64C 3/56 |

*Primary Examiner* — Richard R. Green
(74) *Attorney, Agent, or Firm* — Athorus, PLLC

(57) ABSTRACT

Described are apparatus and processes for reconfiguring aerial vehicles, such as unmanned aerial vehicles (UAV) during navigation of the aerial vehicle between a maneuverability configuration and an efficiency configuration. When an aerial vehicle needs to be able to quickly maneuver in any direction (vertical, horizontal, pitch, roll, yaw) it is operating in a maneuverability configuration. When configured to operate in the maneuverability configuration, the primary function of the aerial vehicle configuration is to increase maneuverability of the aerial vehicle. When the aerial vehicle is navigating in a direction that is substantially horizontal, for example when navigating between locations, it may be configured to operate in an efficiency configuration. When configured to operate in the efficiency configuration, the primary function of the aerial vehicle configuration is to increase efficiency of the aerial vehicle and reduce power consumption.

19 Claims, 16 Drawing Sheets

(56) References Cited

U.S. PATENT DOCUMENTS

| | | | |
|---|---|---|---|
| 2015/0232180 A1* | 8/2015 | Nam | B64C 37/00 244/2 |
| 2017/0174336 A1* | 6/2017 | Baba | B64C 1/30 |
| 2017/0225782 A1* | 8/2017 | Kohstall | B64C 1/063 |
| 2018/0178896 A1* | 6/2018 | Lee | B64C 1/30 |

* cited by examiner

US 10,800,521 B1

CONFIGURABLE AERIAL VEHICLES

BACKGROUND

Multi-propeller aerial vehicles (e.g., quad-copters, octo-copters) are becoming more common. All such vehicles require a body configuration that will support the separation of the multiple propellers, the control components, the power supply (e.g., battery), etc. However, there is a balance between weight and duration of flight. As the weight increases, for example to support more components, the flight duration will decrease.

BRIEF DESCRIPTION OF THE DRAWINGS

The detailed description is set forth with reference to the accompanying figures.

DETAILED DESCRIPTION

Figure 1:
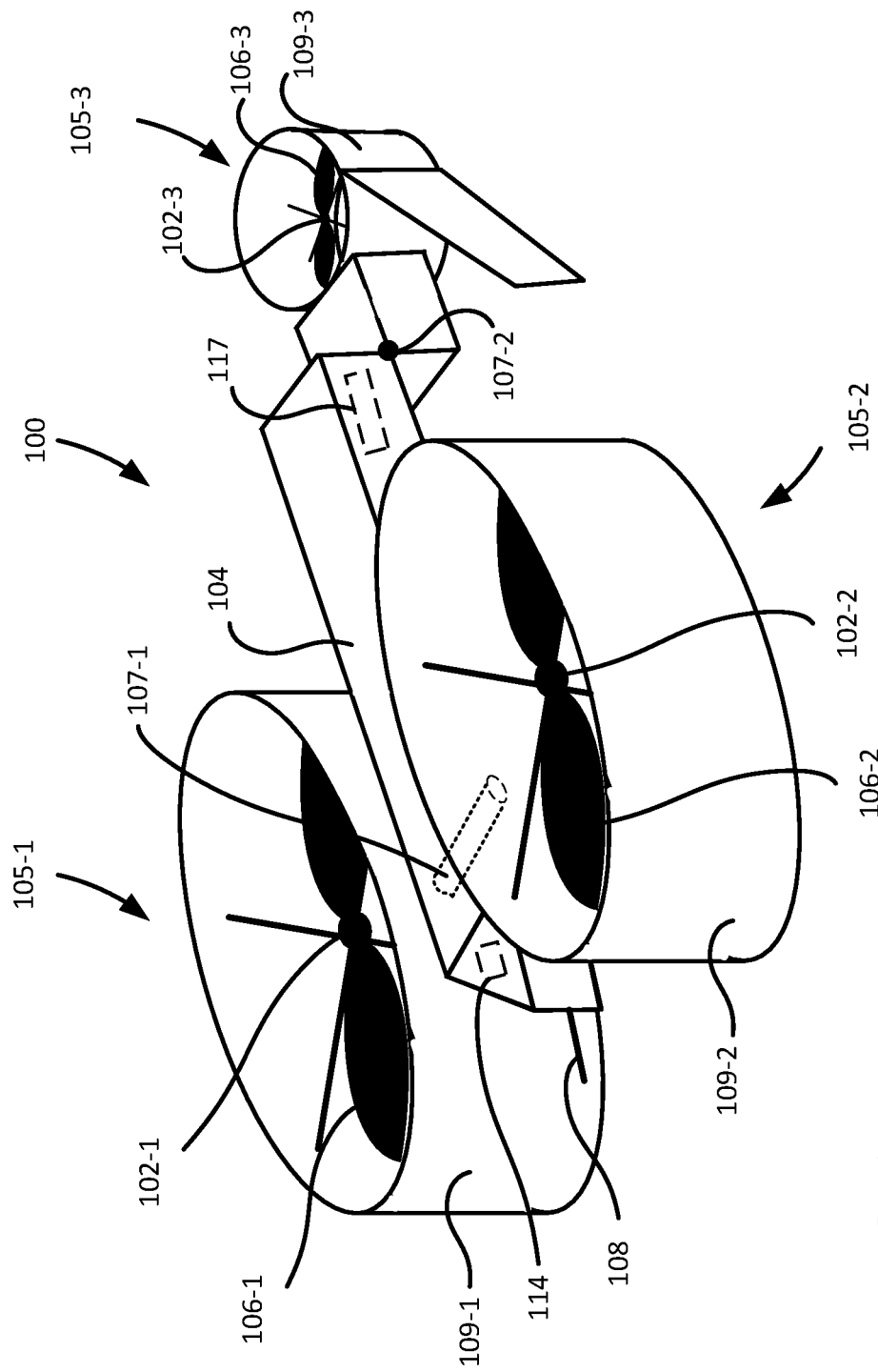
FIG. 1 is an illustration of an aerial vehicle with pivot assemblies in a maneuverability configuration, in accordance with described implementations.

This disclosure describes reconfigurable aerial vehicles, such as unmanned aerial vehicles (UAV), that can be adjusted, during flight, between a maneuverability configuration and an efficiency configuration. When an aerial vehicle needs to be able to quickly maneuver in any direction (vertical, horizontal, pith, roll, yaw) it is operating in a maneuverability configuration. When configured to operate in the maneuverability configuration, the primary function of the aerial vehicle configuration is to increase maneuverability of the aerial vehicle. The increased maneuverability may require higher power consumption. An example of when an aerial vehicle is configured to operate with a maneuverability configuration is during vertical takeoff or landing (VTOL), and/or during navigation near obstacles. In some implementations, as discussed below, the propulsion mechanisms may be ducted propellers and corresponding propeller motors. In a ducted configuration, the thrust generated by the propeller is increased, thereby reducing the power consumption to generate the thrust.

When an aerial vehicle is navigating in a direction that is substantially horizontal, for example when navigating between locations, it may be configured to operate in an efficiency configuration. When configured to operate in the efficiency configuration, the primary function of the aerial vehicle configuration is to increase efficiency of the aerial vehicle and reduce power consumption. The increased efficiency may result in decreased maneuverability. The efficiency configuration facilitates extended flight duration.

As discussed herein, the aerial vehicles include one or more pivot assemblies that may be activated to reposition one or more propulsion mechanisms of the aerial vehicle between a maneuverability configuration and an efficiency configuration. Each pivot assembly may control the position of one or more propulsion mechanisms. When the pivot assemblies are in a maneuverability configuration, the propulsion mechanisms are oriented to enable VTOL, hover, etc., and so that the propulsion mechanisms generate a substantially vertical lifting force. When the pivot assemblies are in an efficiency configuration, the propulsion mechanisms are rotated and positioned to provide a substantially horizontal thrust, thereby improving the efficiency of horizontal flight of the aerial vehicle. Likewise, as discussed below, in some implementations, the propulsion mechanisms may be ducted and, when the propulsion mechanisms are in the efficiency configuration and the aerial vehicle is navigating in a direction that is substantially horizontal, the shape of the ducts provide additional lift to the aerial vehicle, thereby further increasing the operating efficiency of the aerial vehicle.

When the propulsion mechanisms are in the efficiency configuration, the lift produced from the ducts during horizontal flight improves the efficiency of the aerial vehicle and the rotational speed of the propulsion mechanisms may be reduced, thereby reducing the power consumption of the aerial vehicle.

In some implementations, the pivot assemblies may be mechanically adjusted between the maneuverability configuration and the efficiency configuration. In other implementations, the pivot assemblies may be adjusted based on the position of one or more propulsion mechanisms. For example, the propulsion mechanisms adjusted by the pivot assembly may be offset with respect to one another about an axis so that two of the propulsion mechanisms may be used to rotate the pivot assembly between the maneuverability configuration and the efficiency configuration. For example, rather than utilizing another motor, such as a servo motor, a gear assembly, or other additional component to rotate the pivot assembly between the maneuverability configuration and the efficiency configuration, the force generated by a first propulsion mechanism may be increased or decreased with respect to the force generated by a second, offset propulsion mechanism to move the pivot assembly between the maneuverability configuration and the efficiency configuration. For example, if the force generated by the first propulsion mechanism is greater than the force generated by the second propulsion mechanism, the resulting differential force will cause the pivot assembly to rotate from the maneuverability configuration to the efficiency configuration. If the force generated by the second propulsion mechanism is greater than the force generated by the first propulsion mechanism, the resulting differential force will cause the pivot assembly to rotate from the efficiency configuration to the maneuverability configuration.

In still other examples, the pivot assemblies may be held in place with one or more retractable pins or latches. To alter the position of the propulsion mechanisms between the maneuverability configuration and the efficiency configuration, the pin is retracted and the rotational force generated by rotation of the propeller within the propulsion mechanism will cause the propulsion mechanism to rotate the pivot assembly to rotate the propulsion mechanism between the efficiency configuration and the maneuverability configuration or between the maneuverability configuration and the efficiency configuration.

To further improve the efficiency of the aerial vehicle, in some implementations, the frame, ducts, pivot assemblies, propellers, and/or other components of the aerial vehicle may be formed of one or more lightweight materials, such as carbon fiber, graphite, machined aluminum, titanium, fiberglass, etc.

While the examples discussed herein describe the implementations with respect to an aerial vehicle, the implementations may likewise be utilized on other types of vehicles. For example, the pivot assembly described herein may be utilized on a ground based vehicle, an unmanned ground based vehicle, a water based vehicle, and/or an unmanned water based vehicle.

FIG. 1 illustrates a block diagram of a top-down view of an aerial vehicle 100, in this example a UAV, with a first pivot assembly 107-1 in a maneuverability configuration and a second pivot assembly 107-2 in a maneuverability configuration, according to an implementation. As illustrated, the aerial vehicle 100 includes a frame 104. The frame 104 or body of the aerial vehicle 100 may be formed of any suitable material, such as graphite, carbon fiber, aluminum, etc., or any combination thereof. In this example, the frame 104 of the aerial vehicle 100 is formed of machined aluminum in a rectangular shape.

The first pivot assembly 107-1 is mounted toward a front of the frame and is used to alter the position of a first propulsion mechanism 105-1 and a second propulsion mechanism 105-2. The second pivot assembly 107-2 is mounted at the rear or tail of the frame 104 and is used to alter the position of a third propulsion mechanism 105-3. In this example, the propulsion mechanisms 105 each include a motor 106 and a propeller 102. For example, the first propulsion mechanism includes a first motor 106-1 and a first propeller 102-1, the second propulsion mechanism includes a second motor 106-2 and a second propeller 102-2, and the third propulsion mechanism includes a third motor 106-3 and a third propeller 102-3. Any form of motor and/or propeller may be used in the described examples. In one implementation, the motors are outrunner brushless motors and the propellers are twenty-four-inch carbon fiber propellers. In other implementations, other forms of motors and/or propellers may likewise be utilized. For example, the motors may be inrunner brushless motors, or brushed motors. Likewise, the propellers may be formed of graphite, wood, etc. In still other implementations, rather than motors and corresponding propellers, in some implementations, the propulsion mechanisms 105 may include fans, jets, turbojets, turbo fans, jet engines, internal combustion engines, and the like (either with propellers or other devices) to provide lifting forces and/or thrusting forces for the aerial vehicle.

Each propulsion mechanism 105 may also include a duct 109 that surrounds the motor 106 and propeller 102 to form a ducted propulsion mechanism 105. For example, the first propulsion mechanism 105-1 may include a first duct 109-1 that surrounds the first motor 106-1 and the first propeller 102-1, the second propulsion mechanism 105-2 may include a second duct 109-2 that surrounds the second motor 106-2 and the second propeller 102-2, and the third propulsion mechanism 105-3 may include a third duct 109-3 that surrounds the third motor 106-3 and the third propeller 102-3. As is known, when propellers are ducted, the thrust generated by the propeller at the same power level is increased compared to the same propeller at the same power level without a duct.

The propulsion mechanisms 105 may all be of the same or similar size. Alternatively, as illustrated in FIG. 1, some or all the propulsion mechanisms may be different sizes. For example, the first propulsion mechanism 105-1 and the second propulsion mechanism 105-2 may be approximately the same size and the third propulsion mechanism 105-3 may be smaller, as illustrated, or larger. Likewise, while this example includes three propulsion mechanisms, as illustrated in other implementations discussed below, more or fewer propulsion mechanisms may be utilized. Likewise, in some implementations, the propulsion mechanisms may be positioned at different locations on the aerial vehicle 100.

Mounted to a first end, or front end, of the frame 104 of the aerial vehicle 100 is one or more antennas 108. The antennas 108 may be used to transmit and/or receive wireless communications. For example, the antennas 108 may be utilized for Wi-Fi, satellite, near field communication ("NFC"), cellular communication, or any other form of wireless communication. Other components, such as cameras, time of flight sensors, distance determining elements, gimbals, etc., may likewise be mounted to the frame 104 of the aerial vehicle 100.

An aerial vehicle control system 114 is also mounted to the frame 104. In this example, the aerial vehicle control system 114 is mounted toward the front and top of the frame 104. In other implementations, the aerial vehicle control system 114, or components thereof, may be mounted or positioned at other locations of the aerial vehicle 100. The aerial vehicle control system 114, as discussed in further detail below with respect to FIG. 16, controls the operation, routing, navigation, communication, motor controls, the payload engagement mechanism, and pivot assemblies of the aerial vehicle 100.

Likewise, the aerial vehicle 100 includes one or more power modules 117. The power modules may be mounted at various locations on the frame 104 of the aerial vehicle 100. For example, in some implementations, four power modules may be mounted to an underneath side of the frame 104. The power modules for the aerial vehicle 100 may be in the form of battery power, solar power, gas power, super capacitor, fuel cell, alternative power generation source, or a combination thereof. For example, the power modules may each be a lithium-ion polymer battery, or polymer lithium ion (Li-poly, Li-Pol, LiPo, LIP, PLI or Lip) battery. The power module(s) are coupled to and provide power for the aerial vehicle control system 114, the propulsion mechanisms 105, the payload engagement mechanism, the pivot assemblies 107, etc.

In some implementations, one or more of the power modules may be configured such that it can be autonomously removed and/or replaced with another power module while the aerial vehicle is landed or in flight. For example, when the aerial vehicle 100 lands at a location, the aerial vehicle may engage with a charging member at the location that will recharge the power module.

Figure 2:
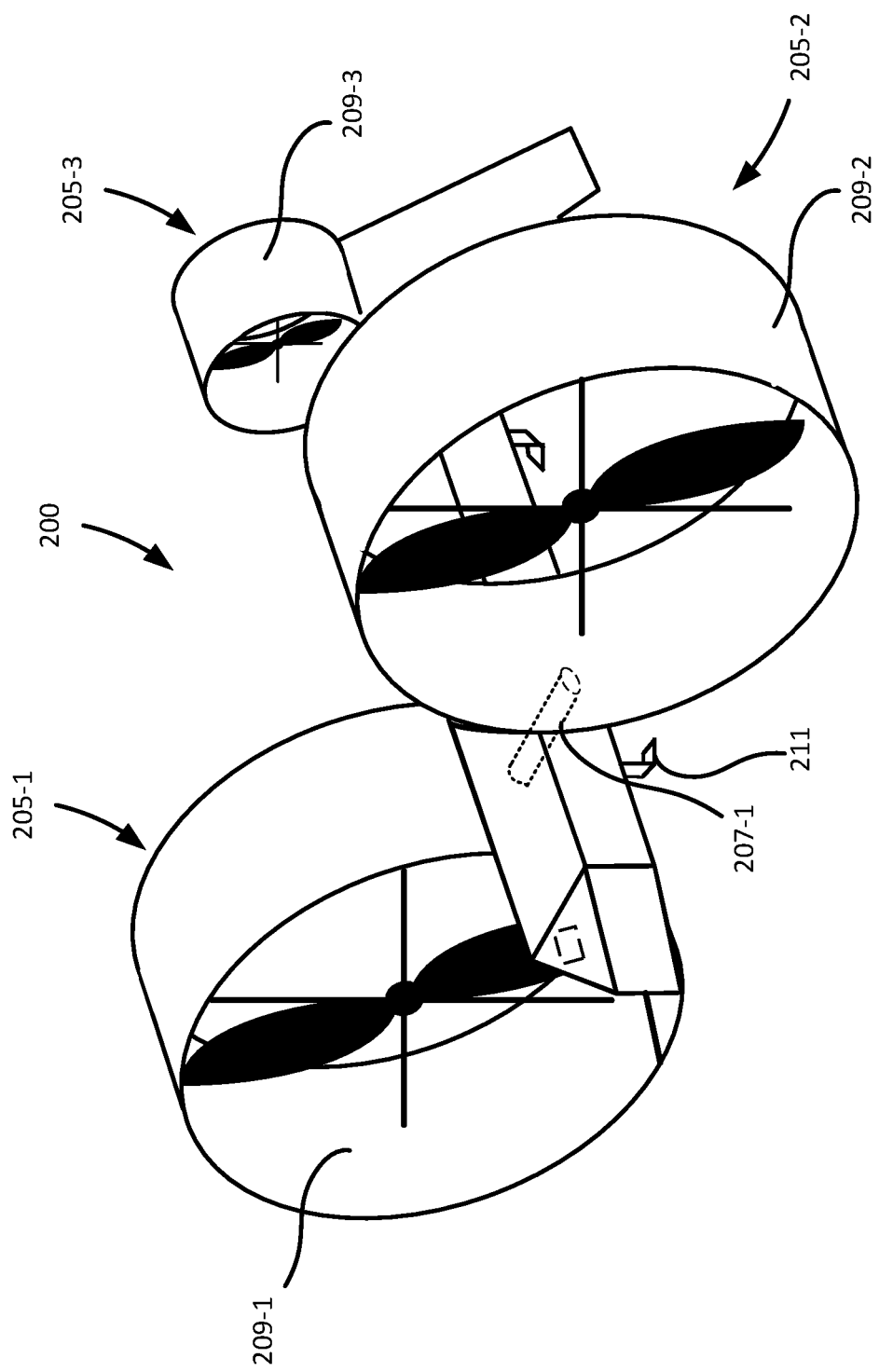
FIG. 2 is an illustration of the aerial vehicle of FIG. 1 with the pivot assemblies in an efficiency configuration, in accordance with described implementations.

As mentioned above, the aerial vehicle 100 may also include a payload engagement mechanism 211 (FIG. 2). The payload engagement mechanism may be configured to engage and disengage a payload (e.g., an item or a container that contains items). In other implementations, the payload engagement mechanism may operate as the container, in which it contains item(s). In this example, the payload engagement mechanism is positioned beneath the frame 104 of the aerial vehicle 100. The payload engagement mechanism communicates with (via wired or wireless communication) and is controlled by the aerial vehicle control system 114.

Also coupled to the frame 104 is the first pivot assembly 107-1. In this example, the first pivot assembly 107-1 is coupled to and controls rotation of the first propulsion mechanism 105-1 and the second propulsion mechanism 105-2. The first propulsion mechanism 105-1 and the second propulsion mechanism 105-2 are coupled to a pivot assembly and are configured to rotate about an axis with respect to the frame 104 of the aerial vehicle 100. The pivot assembly 107 may be adjusted to rotate the propulsion mechanisms mechanically (e.g., with a servo motor), pneumatically, hydraulically, etc. Likewise, the pivot assembly 107-1 may include stops that stop the rotation of the pivot assembly at desired positions (maneuverability configuration, efficiency configuration). In some implementations, the pivot assembly 107 may include a dampener, electric brake or other inertial component to control a rate of rotation of the pivot assembly. Likewise, the dampener or other inertial component may be used to position the pivot assembly 107 at other angles with respect to the frame 104 of the aerial vehicle 100.

Also coupled to the frame 104 is the second pivot assembly 107-2. In this example, the second pivot assembly 107-2 is coupled to and controls rotation of the third propulsion mechanism 105-3. The third propulsion mechanism 105-3 is coupled to the pivot assembly and configured to rotate about an axis with respect to the frame 104 of the aerial vehicle 100. The pivot assembly 107-2 may be adjusted to rotate the propulsion mechanism 105-3 mechanically (e.g., with a servo motor), pneumatically, hydraulically, etc. Likewise, the pivot assembly 107-2 may include stops that stop the rotation of the pivot assembly at desired positions (maneuverability configuration, efficiency configuration). In some implementations, the pivot assembly 107-2 may include a dampener, electric brake or other inertial component to control a rate of rotation of the pivot assembly. Likewise, the dampener or other inertial component may be used to position the pivot assembly 107-2 at other angles with respect to the frame 104 of the aerial vehicle 100.

When the aerial vehicle is configured in the maneuverability configuration, the propulsion mechanisms are oriented to produce a vertical thrust that enables VTOL and/or rapid maneuvering in any direction. Likewise, the aerial vehicle, when in the maneuverability configuration, can hover, pitch, yaw, roll, etc., in any direction.

FIG. 2 is an illustration of the aerial vehicle 100 of FIG. 1 with the pivot assemblies 207 in an efficiency configuration, in accordance with described implementations. Except where otherwise noted, reference numerals preceded by the number "2" shown in FIG. 2 indicate components or features that are similar to components or features having reference numerals preceded by the number "1" shown in FIG. 1.

When the pivot assemblies 207, such as the first pivot assembly 207-1, are rotated into the efficiency configuration, as illustrated in FIG. 2, the propulsion mechanisms 205-1, 205-2, and 205-3 are in a position to generate horizontal thrust to propel the aerial vehicle 200 in a direction that is substantially horizontal. Likewise, the ducts 209-1, 209-2, and 209-3 have an airfoil shape and produce lift from air passing over and through the ducts 209 when the aerial vehicle 200 navigates in a horizontal direction, thereby maintaining altitude of the aerial vehicle 200.

The position of the propulsion mechanisms 205 to generate horizontal thrust and the lift produced from the airfoil shaped ducts reduces the power required to propel the aerial vehicle 200 during horizontal flight. Likewise, the rotation of the propulsion mechanisms 205 into the efficiency configuration reduces the drag and profile of the aerial vehicle that would result during horizontal flight if the propulsion mechanisms were not rotated. Specifically, if the propulsion mechanisms remained in the maneuverability configuration, drag would result from the ducts during horizontal flight. Likewise, to generate the necessary horizontal force to propel the aerial vehicle in a horizontal direction, the aerial vehicle would have to operate with a forward pitch, thereby increasing the profile of the aerial vehicle and the resulting drag. In comparison, by rotating the propulsion mechanisms 205 with the pivot assemblies 207 into the efficiency configuration, the drag from the ducts is converted into lift as the air passes over the airfoil shape of the ducts 209. Likewise, because the propulsion mechanisms are rotated to produce horizontal thrust, the aerial vehicle 100 can navigate with less of a forward pitch, or no forward pitch, thereby reducing the profile of the aerial vehicle and resulting drag.

While the implementations discussed with respect to FIGS. 1 and 2 describe the maneuverability configuration in which the propulsion mechanisms are oriented to generate vertical thrust or a lifting force and the efficiency configuration in which the propulsion mechanisms are oriented to generate horizontal thrust, in other implementations, one or more of the propulsion mechanisms may be positioned at other angles. For example, if vertical thrust is considered to be a thrust at a zero-degree angle and horizontal thrust is considered to be a thrust at a ninety-degree angle, in some implementations, the propulsion mechanisms may be oriented to generate a thrust that is between plus or minus ten degrees from zero degrees when positioned in the maneuverability configuration and between eighty and one-hundred degrees when positioned in the efficiency configuration. In other implementations, the range of angles may be greater or smaller. Likewise, in some implementations, two or more of the propulsion mechanisms may be oriented at different angles. For example, the first propulsion mechanism 205-1 may be oriented to generate thrust at approximately eleven degrees when in the maneuverability configuration and the second propulsion mechanism 205-2 may be oriented to generate thrust at approximately four degrees when in the maneuverability configuration. Accordingly, it will be appreciated that some or all of the propulsion mechanisms may be oriented at different angles when in the maneuverability configuration and/or in the efficiency configuration.

While the implementations of the aerial vehicles discussed herein utilize propulsion mechanisms in the form of propellers, motors, and ducts, to achieve and maintain flight, in other implementations, the aerial vehicle may be configured in other manners. For example, the aerial vehicle may include fixed wings and/or a combination of both propulsion mechanisms and fixed wings.

Figure 3:
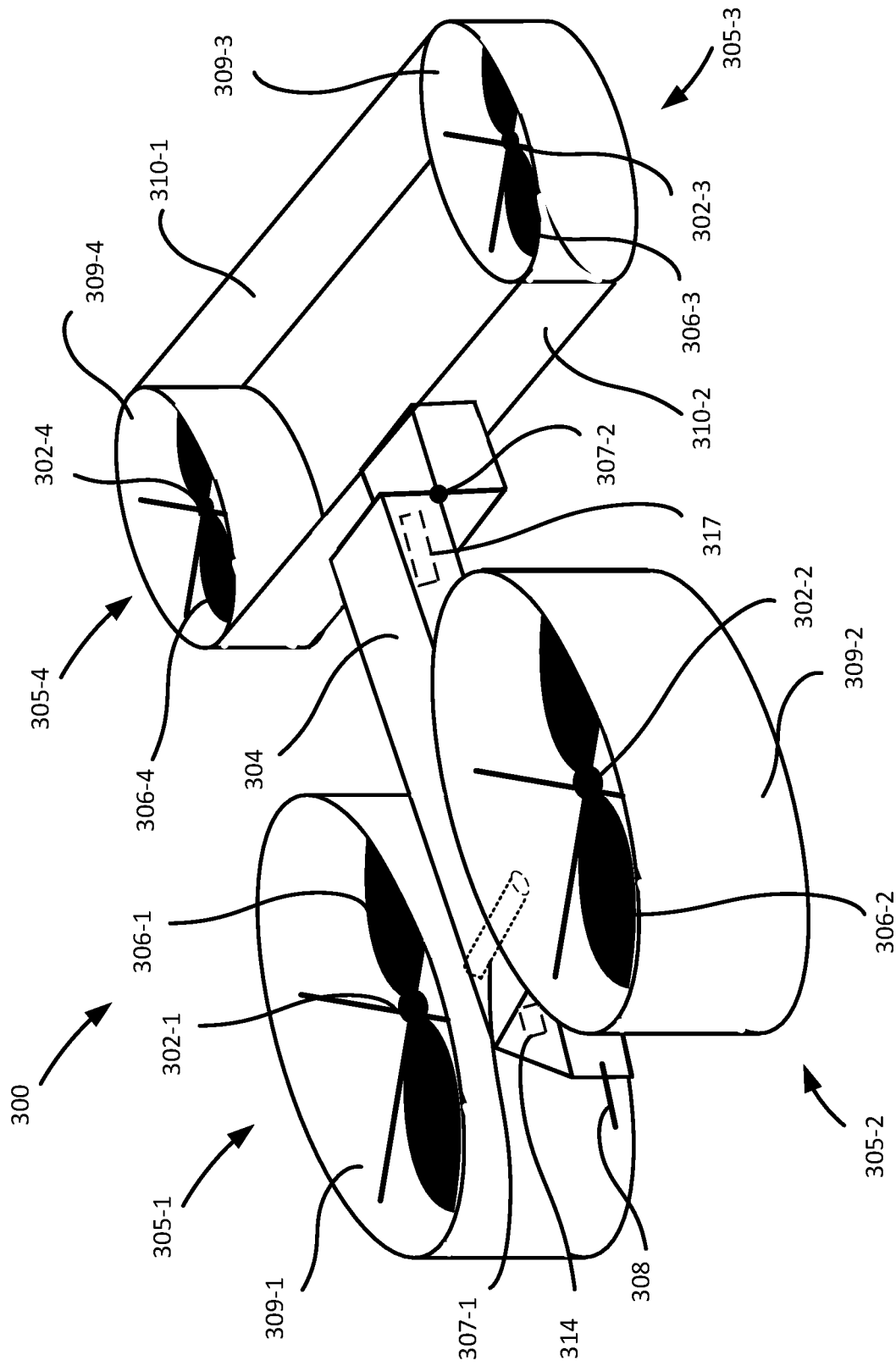
FIG. 3 is an illustration of an aerial vehicle with pivot assemblies in a maneuverability configuration, in accordance with described implementations.

FIG. 3 illustrates a block diagram of a top-down view of an aerial vehicle 300, in this example a UAV, with a first pivot assembly 307-1 in a maneuverability configuration and a second pivot assembly 307-2 in a maneuverability configuration, according to an implementation. Except where otherwise noted, reference numerals preceded by the number "3" shown in FIG. 3 indicate components or features that are similar to components or features having reference numerals preceded by the number "1" shown in FIG. 1 and/or reference numerals preceded by the number "2" shown in FIG. 2.

As illustrated, the aerial vehicle 300 includes a frame 304. The frame 304 or body of the aerial vehicle 300 may be formed of any suitable material, such as graphite, carbon fiber, aluminum, etc., or any combination thereof. In this example, the frame 304 of the aerial vehicle 300 is formed of machined aluminum in a rectangular shape.

The first pivot assembly 307-1 is mounted toward a front of the frame and is used to alter the position of a first propulsion mechanism 305-1 and a second propulsion mechanism 305-2. The second pivot assembly 307-2 is mounted at the rear or tail of the frame 304 and is used to alter the position of a third propulsion mechanism 305-3 and a fourth propulsion mechanism 305-4. In this example, the propulsion mechanisms 305 each include a motor 306 and a propeller 302. For example, the first propulsion mechanism includes a first motor 306-1 and a first propeller 302-1, the second propulsion mechanism includes a second motor 306-2 and a second propeller 302-2, the third propulsion mechanism includes a third motor 306-3 and a third propeller 302-3, and the fourth propulsion mechanism includes a fourth motor 306-4 and a fourth propeller 302-4. Any form of motor and/or propeller may be used in the described examples. In one implementation, the motors are outrunner brushless motors and the propellers are twenty-four-inch carbon fiber propellers. In other implementations, other forms of motors and/or propellers may likewise be utilized. For example, the motors may be inrunner brushless motors, or brushed motors. Likewise, the propellers may be formed of graphite, wood, etc. In still other implementations, rather than motors and corresponding propellers, in some implementations, the propulsion mechanisms 305 may include fans, jets, turbojets, turbo fans, jet engines, internal combustion engines, and the like (either with propellers or other devices) to provide lifting forces and/or thrusting forces for the aerial vehicle.

Each propulsion mechanism 305 may also include a duct 309 that surrounds the motor 306 and propeller 302 to form a ducted propulsion mechanism 305. For example, the first propulsion mechanism 305-1 may include a first duct 309-1 that surrounds the first motor 306-1 and the first propeller 302-1, the second propulsion mechanism 305-2 may include a second duct 309-2 that surrounds the second motor 306-2 and the second propeller 302-2, the third propulsion mechanism 305-3 may include a third duct 309-3 that surrounds the third motor 306-3 and the third propeller 302-3, and the fourth propulsion mechanism 305-4 may include a fourth duct that surrounds the fourth motor 306-4 and the fourth propeller 302-4. As is known, when propellers are ducted, the thrust generated by the propeller at the same power level is increased compared to the same propeller at the same power level without a duct.

The propulsion mechanisms 305 may all be of the same or similar size. Alternatively, as illustrated in FIG. 3, some or all the propulsion mechanisms may be different sizes. For example, the first propulsion mechanism 305-1 and the second propulsion mechanism 305-2 may be approximately the same size and the third propulsion mechanism 305-3 and fourth propulsion mechanism 305-4 may be smaller, as illustrated, or larger. Likewise, while this example includes four propulsion mechanisms, as illustrated in other implementations, more or fewer propulsion mechanisms may be utilized. Likewise, in some implementations, the propulsion mechanisms may be positioned at different locations on the aerial vehicle 300. For example, the first propulsion mechanism 305-1 and the second propulsion mechanism 305-2 are positioned close to either side of the frame 304 and rotate about a mid point of each propulsion mechanism with respect to the frame. In comparison, the third propulsion mechanism 305-3 and the fourth propulsion mechanism 305-4 are positioned above the frame 304 and separated laterally away from each other and away from the frame 304.

In the illustrated example, the third propulsion mechanism 305-3 and the fourth propulsion mechanism 305-4 are separated by and coupled to the pivot assembly 307-2 by an upper wing 310-1 and a lower wing 310-2. The upper wing 310-1 and lower wing 310-2 have an airfoil shape and provide lift to the aerial vehicle when the aerial vehicle is in the efficiency configuration (FIG. 4) and traveling in a substantially horizontal direction.

Mounted to a first end, or front end, of the frame 304 of the aerial vehicle 300 is one or more antennas 308. The antennas 308 may be used to transmit and/or receive wireless communications. For example, the antennas 308 may be utilized for Wi-Fi, satellite, near field communication ("NFC"), cellular communication, or any other form of wireless communication. Other components, such as cameras, time of flight sensors, distance determining elements, gimbals, etc., may likewise be mounted to the frame 304 of the aerial vehicle 300.

An aerial vehicle control system 314 is also mounted to the frame 304. In this example, the aerial vehicle control system 314 is mounted toward the front and top of the frame 304. In other implementations, the aerial vehicle control system 314, or components thereof, may be mounted or positioned at other locations of the aerial vehicle 300. The aerial vehicle control system 314, as discussed in further detail below with respect to FIG. 16, controls the operation, routing, navigation, communication, motor controls, the payload engagement mechanism, and pivot assemblies of the aerial vehicle 300.

Likewise, the aerial vehicle 300 includes one or more power modules 317. The power modules may be mounted at various locations on the frame 304 of the aerial vehicle 300. For example, in some implementations, four power modules may be mounted to an underneath side of the frame 304. The power modules for the aerial vehicle 300 may be in the form of battery power, solar power, gas power, super capacitor, fuel cell, alternative power generation source, or a combination thereof. For example, the power modules may each be a lithium-ion polymer battery, or polymer lithium ion (Li-poly, Li-Pol, LiPo, LIP, PLI or Lip) battery. The power module(s) are coupled to and provide power for the aerial vehicle control system 314, the propulsion mechanisms 305, the payload engagement mechanism, the pivot assemblies 307, etc.

In some implementations, one or more of the power modules may be configured such that it can be autonomously removed and/or replaced with another power module while the aerial vehicle is landed or in flight. For example, when the aerial vehicle 300 lands at a location, the aerial vehicle may engage with a charging member at the location that will recharge the power module.

Figure 4:
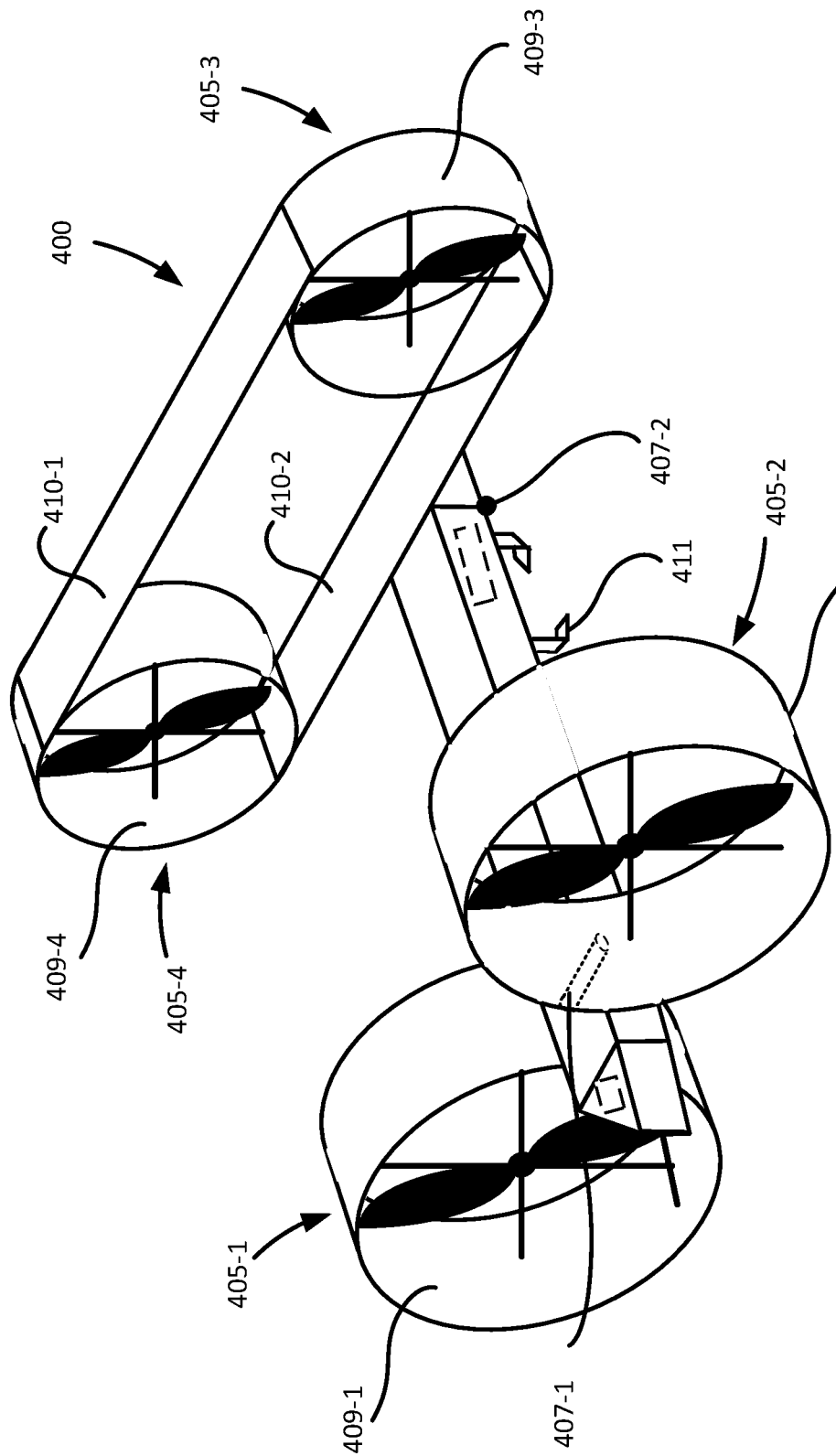
FIG. 4 is an illustration of the aerial vehicle of FIG. 3 with the pivot assemblies in an efficiency configuration, in accordance with described implementations.

As mentioned above, the aerial vehicle 300 may also include a payload engagement mechanism 411 (FIG. 4). The payload engagement mechanism may be configured to engage and disengage a payload (e.g., an item or a container that contains items). In other implementations, the payload engagement mechanism may operate as the container, in which it contains item(s). In this example, the payload engagement mechanism is positioned beneath the frame 304 of the aerial vehicle 300. The payload engagement mechanism communicates with (via wired or wireless communication) and is controlled by the aerial vehicle control system 314.

Also coupled to the frame 304 is the first pivot assembly 307-1. In this example, the first pivot assembly 307-1 is coupled to and controls rotation of the first propulsion mechanism 305-1 and the second propulsion mechanism 305-2. The first propulsion mechanism 305-1 and the second propulsion mechanism 305-2 are coupled to a pivot assembly and are configured to rotate about an axis with respect to the frame 304 of the aerial vehicle 300. The pivot assembly 307-1 may be adjusted to rotate the propulsion mechanisms mechanically (e.g., with a servo motor), pneumatically, hydraulically, etc. Likewise, the pivot assembly 307-1 may include stops that stop the rotation of the pivot assembly at desired positions (maneuverability configuration, efficiency configuration). In some implementations, the pivot assembly 307-1 may include a dampener, electric brake or other inertial component to control a rate of rotation of the pivot assembly. Likewise, the dampener or other inertial component may be used to position the pivot assembly 307-1 at other angles with respect to the frame 304 of the aerial vehicle 300.

Also coupled to the frame 304 is the second pivot assembly 307-2. In this example, the second pivot assembly 307-2 is coupled to and controls rotation of the third propulsion mechanism 305-3, the fourth propulsion mechanism 305-4, the upper wing 310-1 and the lower wing 310-2. The lower wing 310-2 is coupled to the pivot assembly 307-2 at approximately a mid-point in the lower wing 310-2. A lower side of the third propulsion mechanism 305-3 is coupled to one end of the lower wing 310-2 and a lower side of the fourth propulsion mechanism 305-4 is coupled to an opposing end of the lower wing 310-2. An upper side of the third propulsion mechanism 305-3 is coupled to a first end of the upper wing 310-1 and an upper side of the fourth propulsion mechanism 305-4 is coupled to the second, opposing end of the upper wing 310-1 such that the upper wing 310-1 and the lower wing 310-2 are substantially parallel with each other. The pivot assembly 307-2 may be adjusted to rotate the third propulsion mechanism 305-3, fourth propulsion mechanism 305-4, upper wing 310-1, and lower wing 310-2 mechanically (e.g., with a servo motor), pneumatically, hydraulically, etc. Likewise, the pivot assembly 307-2 may include stops that stop the rotation of the pivot assembly at desired positions (maneuverability configuration, efficiency configuration). In some implementations, the pivot assembly 307-2 may include a dampener, electric brake or other inertial component to control a rate of rotation of the pivot assembly. Likewise, the dampener or other inertial component may be used to position the pivot assembly 307-2 at other angles with respect to the frame 304 of the aerial vehicle 300.

When the aerial vehicle is configured in the maneuverability configuration, the propulsion mechanisms are oriented to produce a vertical thrust that enables VTOL and/or rapid maneuvering in any direction. Likewise, the aerial vehicle, when in the maneuverability configuration, can hover, pitch, yaw, roll, etc., in any direction.

FIG. 4 is an illustration of the aerial vehicle 300 of FIG. 3 with the pivot assemblies 407 in an efficiency configuration, in accordance with described implementations. Except where otherwise noted, reference numerals preceded by the number "4" shown in FIG. 4 indicate components or features that are similar to components or features having reference numerals preceded by the number "3" shown in FIG. 3.

When the pivot assemblies 407-1, 407-2 are rotated into the efficiency configuration, as illustrated in FIG. 4, the propulsion mechanisms 405-1, 405-2, 405-3, and 405-4 are in a position to generate horizontal thrust to propel the aerial vehicle 400 in a direction that is substantially horizontal. Likewise, the ducts 409-1, 409-2, 409-3, and 409-4 each have an airfoil shape and produce lift from air passing over and through the ducts 409 when the aerial vehicle 400 navigates in a horizontal direction, thereby maintaining altitude of the aerial vehicle 400. In the example illustrated in FIG. 4, in addition to the ducts providing lift during horizontal flight, the upper wing 410-1 and the lower wing 410-2 also have an airfoil shape and produce lift from air passing over the wings as the aerial vehicle 400 travels in a horizontal direction.

The position of the propulsion mechanisms 405 to generate horizontal thrust and the lift produced from the airfoil shaped ducts 409 and the airfoil shape of the wings 410 reduces the power required to propel the aerial vehicle 400 during horizontal flight. Likewise, the rotation of the propulsion mechanisms 405 into the efficiency configuration reduces the drag and profile of the aerial vehicle that would result during horizontal flight if the propulsion mechanisms were not rotated. Specifically, if the propulsion mechanisms remained in the maneuverability configuration, drag would result from the ducts during horizontal flight. Likewise, to generate the necessary horizontal force to propel the aerial vehicle 400 in a horizontal direction, the aerial vehicle would have to operate with a forward pitch, thereby increasing the profile of the aerial vehicle and the resulting drag. In comparison, by rotating the propulsion mechanisms 405 with the pivot assemblies 407 into the efficiency configuration, the drag from the ducts is converted into lift as the air passes over the airfoil shape of the ducts 409. In addition, because the third propulsion mechanism 405-3 and the fourth propulsion mechanism 405-4 are separated by an upper wing 410-1 and a lower wing 410-2 that is also rotated by the pivot assembly 407-2, the wings 410 provide lift when positioned in the efficiency configuration and the aerial vehicle is traveling in a horizontal direction. Likewise, because the propulsion mechanisms are rotated to produce horizontal thrust, the aerial vehicle 400 can navigate with less of a forward pitch, or no forward pitch, thereby reducing the profile of the aerial vehicle and resulting drag.

While the implementation discussed with respect to FIGS. 3 and 4 describe the maneuverability configuration in which the propulsion mechanisms are oriented to generate vertical thrust or a lifting force and the efficiency configuration in which the propulsion mechanisms are oriented to generate horizontal thrust, in other implementations, one or more of the propulsion mechanisms may be positioned at other angles. For example, if vertical thrust is considered to be a thrust at a zero-degree angle and horizontal thrust is considered to be a thrust at a ninety-degree angle, in some implementations, the propulsion mechanisms may be oriented to generate a thrust that is between plus or minus ten degrees from zero degrees when positioned in the maneuverability configuration and between eighty and one-hundred degrees when positioned in the efficiency configuration. In other implementations, the range of angles may be greater or smaller. Likewise, in some implementations, two or more of the propulsion mechanisms may be oriented at different angles. For example, the first propulsion mechanism 405-1 may be oriented to generate thrust at approximately eleven degrees when in the maneuverability configuration and the second propulsion mechanism 405-2 may be oriented to generate thrust at approximately four degrees when in the maneuverability configuration. Accordingly, it will be appreciated that some or all of the propulsion mechanisms may be oriented at different angles when in the maneuverability configuration and/or in the efficiency configuration.

Figure 5:
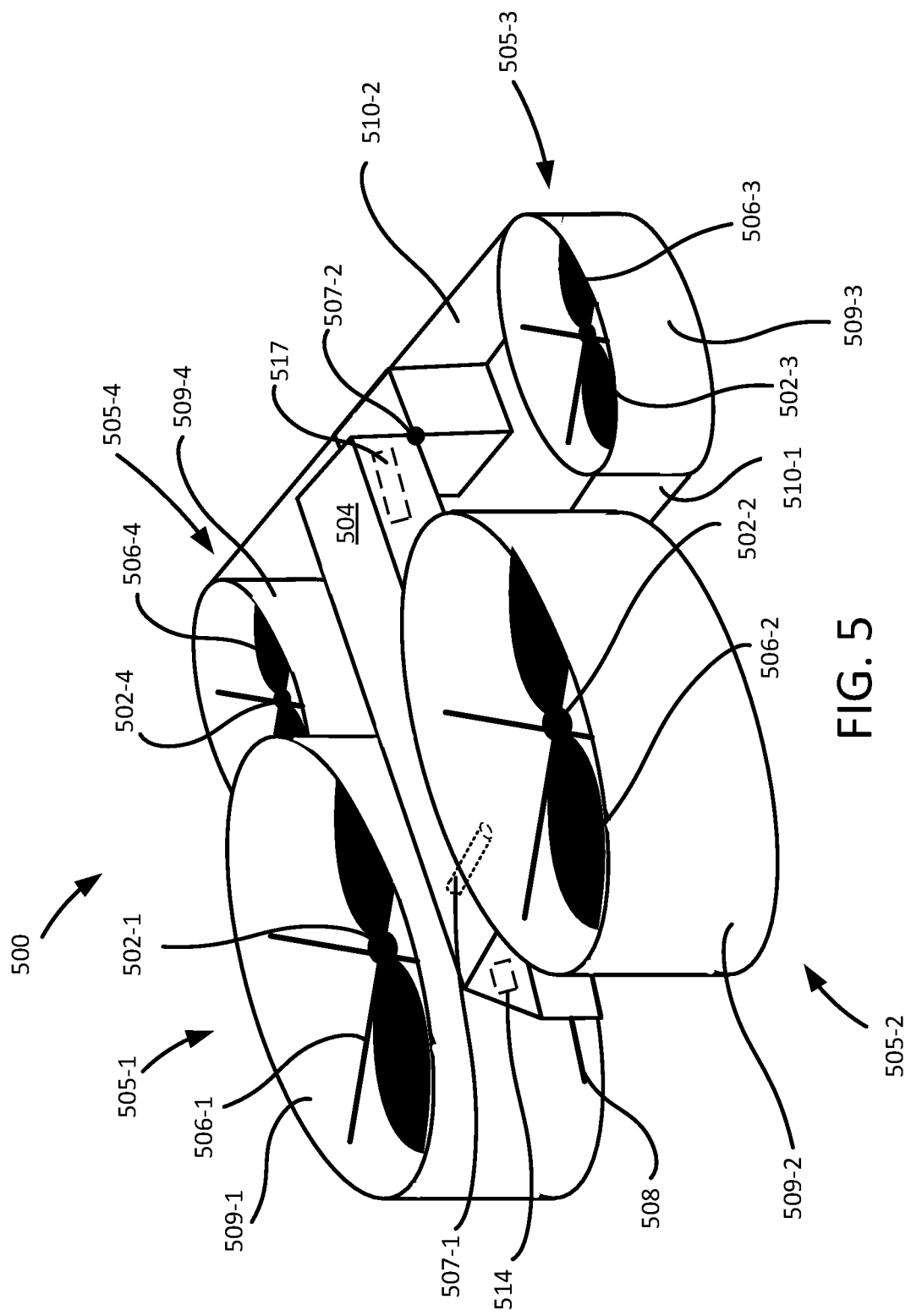
FIG. 5 is an illustration of an aerial vehicle with pivot assemblies in a maneuverability configuration, in accordance with described implementations.

FIG. 5 illustrates a block diagram of a top-down view of an aerial vehicle 500, in this example a UAV, with a first pivot assembly 507-1 in a maneuverability configuration and a second pivot assembly 507-2 in a maneuverability configuration, according to an implementation. Except where otherwise noted, reference numerals preceded by the number "5" shown in FIG. 5 indicate components or features that are similar to components or features having reference numerals preceded by the number "1" shown in FIG. 1, reference numerals preceded by the number "2" shown in FIG. 2, reference numerals preceded by the number "3" shown in FIG. 3, and/or reference numerals preceded by the number "4" shown in FIG. 4.

As illustrated, the aerial vehicle 500 includes a frame 504. The frame 504 or body of the aerial vehicle 500 may be formed of any suitable material, such as graphite, carbon fiber, aluminum, etc., or any combination thereof. In this example, the frame 504 of the aerial vehicle 500 is formed of machined aluminum in a rectangular shape.

The first pivot assembly 507-1 is mounted toward a front of the frame and is used to alter the position of a first propulsion mechanism 505-1 and a second propulsion mechanism 505-2. The second pivot assembly 507-2 is mounted at the rear or tail of the frame 504 and is used to alter the position of a third propulsion mechanism 505-3 and a fourth propulsion mechanism 505-4. Similar to the example in FIGS. 3-4, the propulsion mechanisms 505 each include a motor 506 and a propeller 502. For example, the first propulsion mechanism includes a first motor 506-1 and a first propeller 502-1, the second propulsion mechanism includes a second motor 506-2 and a second propeller 502-2, the third propulsion mechanism includes a third motor 506-3 and a third propeller 502-3, and the fourth propulsion mechanism includes a fourth motor 506-4 and a fourth propeller 502-4.

Each propulsion mechanism 505 may also include a duct 509 that surrounds the motor 506 and propeller 502 to form a ducted propulsion mechanism 505. For example, the first propulsion mechanism 505-1 may include a first duct 509-1 that surrounds the first motor 506-1 and the first propeller 502-1, the second propulsion mechanism 505-2 may include a second duct 509-2 that surrounds the second motor 506-2 and the second propeller 502-2, the third propulsion mechanism 505-3 may include a third duct 509-3 that surrounds the third motor 506-3 and the third propeller 502-3, and the fourth propulsion mechanism 505-4 may include a fourth duct 509-4 that surrounds the fourth motor 506-4 and the fourth propeller 502-4.

The propulsion mechanisms 505 may all be of the same or similar size. Alternatively, as illustrated in FIG. 5, some or all the propulsion mechanisms may be different sizes. For example, the first propulsion mechanism 505-1 and the second propulsion mechanism 505-2 may be approximately the same size and the third propulsion mechanism 505-3 and fourth propulsion mechanism 505-4 may be smaller, as illustrated, or larger. Likewise, while this example includes four propulsion mechanisms, as illustrated in other implementations, more or fewer propulsion mechanisms may be utilized. Likewise, in some implementations, the propulsion mechanisms may be positioned at different locations on the aerial vehicle 500. For example, the first propulsion mechanism 505-1 and the second propulsion mechanism 505-2 are positioned close to either side of the frame 504 and rotate about a mid-point of each propulsion mechanism with respect to the frame. In comparison, and different from the example provided with respect to FIGS. 3-4, the third propulsion mechanism 505-3 and the fourth propulsion mechanism 505-4 are positioned below the frame 504 and separated laterally away from each other and away from the frame 504.

In the illustrated example, the third propulsion mechanism 505-3 and the fourth propulsion mechanism 505-4 are separated by and coupled to the pivot assembly 507-2 by an upper wing 510-1 and a lower wing 510-2. The upper wing 510-1 and lower wing 510-2 have an airfoil shape and provide lift to the aerial vehicle when the aerial vehicle is in the efficiency configuration (FIG. 6) and traveling in a substantially horizontal direction.

Mounted to a first end, or front end, of the frame 504 of the aerial vehicle 500 is one or more antennas 508. The antennas 508 may be used to transmit and/or receive wireless communications. For example, the antennas 508 may be utilized for Wi-Fi, satellite, near field communication ("NFC"), cellular communication, or any other form of wireless communication. Other components, such as cameras, time of flight sensors, distance determining elements, gimbals, etc., may likewise be mounted to the frame 504 of the aerial vehicle 500.

An aerial vehicle control system 514 is also mounted to the frame 504. In this example, the aerial vehicle control system 514 is mounted toward the front and top of the frame 504. In other implementations, the aerial vehicle control system 514, or components thereof, may be mounted or positioned at other locations of the aerial vehicle 500. The aerial vehicle control system 514, as discussed in further detail below with respect to FIG. 16, controls the operation, routing, navigation, communication, motor controls, the payload engagement mechanism, and pivot assemblies of the aerial vehicle 500.

Likewise, the aerial vehicle 500 includes one or more power modules 517. The power modules may be mounted at various locations on the frame 504 of the aerial vehicle 500. For example, in some implementations, four power modules may be mounted to an underneath side of the frame 504.

Figure 6:
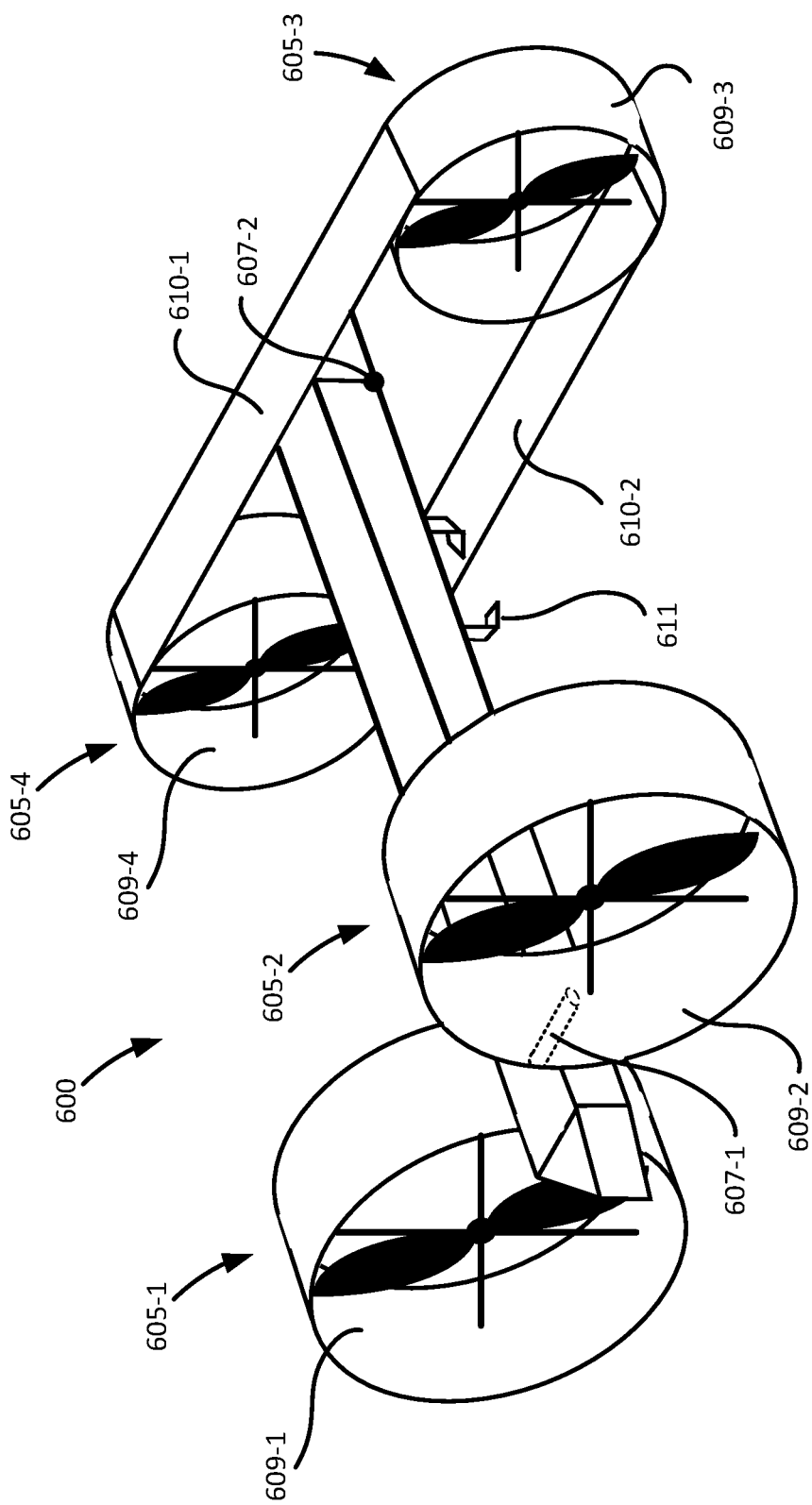
FIG. 6 is an illustration of the aerial vehicle of FIG. 5 with the pivot assemblies in an efficiency configuration, in accordance with described implementations.

As mentioned above, the aerial vehicle 500 may also include a payload engagement mechanism 611 (FIG. 6). The payload engagement mechanism may be configured to engage and disengage a payload (e.g., an item or a container that contains items). In other implementations, the payload engagement mechanism may operate as the container, in which it contains item(s). In this example, the payload engagement mechanism is positioned beneath the frame 504 of the aerial vehicle 500. The payload engagement mechanism communicates with (via wired or wireless communication) and is controlled by the aerial vehicle control system 514.

Also coupled to the frame 504 is the first pivot assembly 507-1. In this example, the first pivot assembly 507-1 is coupled to and controls rotation of the first propulsion mechanism 505-1 and the second propulsion mechanism 505-2. The first propulsion mechanism 505-1 and the second propulsion mechanism 505-2 are coupled to a pivot assembly and are configured to rotate about an axis with respect to the frame 504 of the aerial vehicle 500. The pivot assembly 507-1 may be adjusted to rotate the propulsion mechanisms mechanically (e.g., with a servo motor), pneumatically, hydraulically, etc. Likewise, the pivot assembly 507-1 may include stops that stop the rotation of the pivot assembly at desired positions (maneuverability configuration, efficiency configuration). In some implementations, the pivot assembly 507-1 may include a dampener, electric brake or other inertial component to control a rate of rotation of the pivot assembly. Likewise, the dampener or other inertial component may be used to position the pivot assembly 507-1 at other angles with respect to the frame 504 of the aerial vehicle 500.

Also coupled to the frame 504 is the second pivot assembly 507-2. In this example, the second pivot assembly 507-2 is coupled to and controls rotation of the third propulsion mechanism 505-3, the fourth propulsion mechanism 505-4, the upper wing 510-1 and the lower wing 510-2. The upper wing 510-1 is coupled to the pivot assembly 507-2 at approximately a mid-point in the upper wing 510-1. An upper side of the third propulsion mechanism 505-3 is coupled to one end of the upper wing 510-1 and an upper side of the fourth propulsion mechanism 505-4 is coupled to an opposing end of the upper wing 510-1. A lower side of the third propulsion mechanism 505-3 is coupled to a first end of the lower wing 510-2 and a lower side of the fourth propulsion mechanism 505-4 is coupled to the second, opposing end of the lower wing 510-2 such that the upper wing 510-1 and the lower wing 510-2 are substantially parallel with each other. The pivot assembly 507-2 may be adjusted to rotate the third propulsion mechanism 505-3, fourth propulsion mechanism 505-4, upper wing 510-1, and lower wing 510-2 mechanically (e.g., with a servo motor), pneumatically, hydraulically, etc. Likewise, the pivot assembly 507-2 may include stops that stop the rotation of the pivot assembly at desired positions (maneuverability configuration, efficiency configuration). In some implementations, the pivot assembly 507-2 may include a dampener, electric brake or other inertial component to control a rate of rotation of the pivot assembly. Likewise, the dampener or other inertial component may be used to position the pivot assembly 507-2 at other angles with respect to the frame 504 of the aerial vehicle 500.

When the aerial vehicle is configured in the maneuverability configuration, the propulsion mechanisms are oriented to produce a vertical thrust that enables VTOL and/or rapid maneuvering in any direction. Likewise, the aerial vehicle, when in the maneuverability configuration, can hover, pitch, yaw, roll, etc., in any direction.

FIG. 6 is an illustration of the aerial vehicle 500 of FIG. 5 with the pivot assemblies 607 in an efficiency configuration, in accordance with described implementations. Except where otherwise noted, reference numerals preceded by the number "6" shown in FIG. 6 indicate components or features that are similar to components or features having reference numerals preceded by the number "5" shown in FIG. 5.

When the pivot assemblies 607-1, 607-2 are rotated into the efficiency configuration, as illustrated in FIG. 6, the propulsion mechanisms 605-1, 605-2, 605-3, and 605-4 are in a position to generate horizontal thrust to propel the aerial vehicle 600 in a direction that is substantially horizontal. Likewise, the ducts 609-1, 609-2, 609-3, and 609-4 each have an airfoil shape and produce lift from air passing over and through the ducts 609 when the aerial vehicle 600 navigates in a horizontal direction, thereby maintaining altitude of the aerial vehicle 600. In the example illustrated in FIG. 6, in addition to the ducts providing lift during horizontal flight, the upper wing 610-1 and the lower wing 610-2 also have an airfoil shape and produce lift from air passing over the wings as the aerial vehicle 600 travels in a horizontal direction.

The position of the propulsion mechanisms 605 to generate horizontal thrust and the lift produced from the airfoil shaped ducts 609 and the airfoil shape of the wings 610 reduces the power required to propel the aerial vehicle 600 during horizontal flight. Likewise, the rotation of the propulsion mechanisms 605 into the efficiency configuration reduces the drag and profile of the aerial vehicle that would result during horizontal flight if the propulsion mechanisms were not rotated. Specifically, if the propulsion mechanisms remained in the maneuverability configuration, drag would result from the ducts during horizontal flight. Likewise, to generate the necessary horizontal force to propel the aerial vehicle 600 in a horizontal direction, the aerial vehicle would have to operate with a forward pitch, thereby increasing the profile of the aerial vehicle and the resulting drag. In comparison, by rotating the propulsion mechanisms 605 with the pivot assemblies 607 into the efficiency configuration, the drag from the ducts is converted into lift as the air passes over the airfoil shape of the ducts 609. In addition, because the third propulsion mechanisms 605-3 and the fourth propulsion mechanism 605-4 are separated by an upper wing 610-1 and a lower wing 610-2 that is also rotated by the pivot assembly 607-2, the wings 610 provide lift when positioned in the efficiency configuration. Likewise, because the propulsion mechanisms are rotated to produce horizontal thrust, the aerial vehicle 500 can navigate with less of a forward pitch, or no forward pitch, thereby reducing the profile of the aerial vehicle and resulting drag.

While the implementation discussed with respect to FIGS. 5 and 6 describe the maneuverability configuration in which the propulsion mechanisms are oriented to generate vertical thrust or a lifting force and the efficiency configuration in which the propulsion mechanisms are oriented to generate horizontal thrust, in other implementations, one or more of the propulsion mechanisms may be positioned at other angles. For example, if vertical thrust is considered to be a thrust at a zero-degree angle and horizontal thrust is considered to be a thrust at a ninety-degree angle, in some implementations, the propulsion mechanisms may be oriented to generate a thrust that is between plus or minus ten degrees from zero degrees when positioned in the maneuverability configuration and between eighty and one-hundred degrees when positioned in the efficiency configuration. In other implementations, the range of angles may be greater or smaller. Likewise, in some implementations, two or more of the propulsion mechanisms may be oriented at different angles. For example, the first propulsion mechanism 605-1 may be oriented to generate thrust at approximately eleven degrees when in the maneuverability configuration and the second propulsion mechanism 605-2 may be oriented to generate thrust at approximately four degrees when in the maneuverability configuration. Accordingly, it will be appreciated that some or all of the propulsion mechanisms may be oriented at different angles when in the maneuverability configuration and/or in the efficiency configuration.

Figure 7:
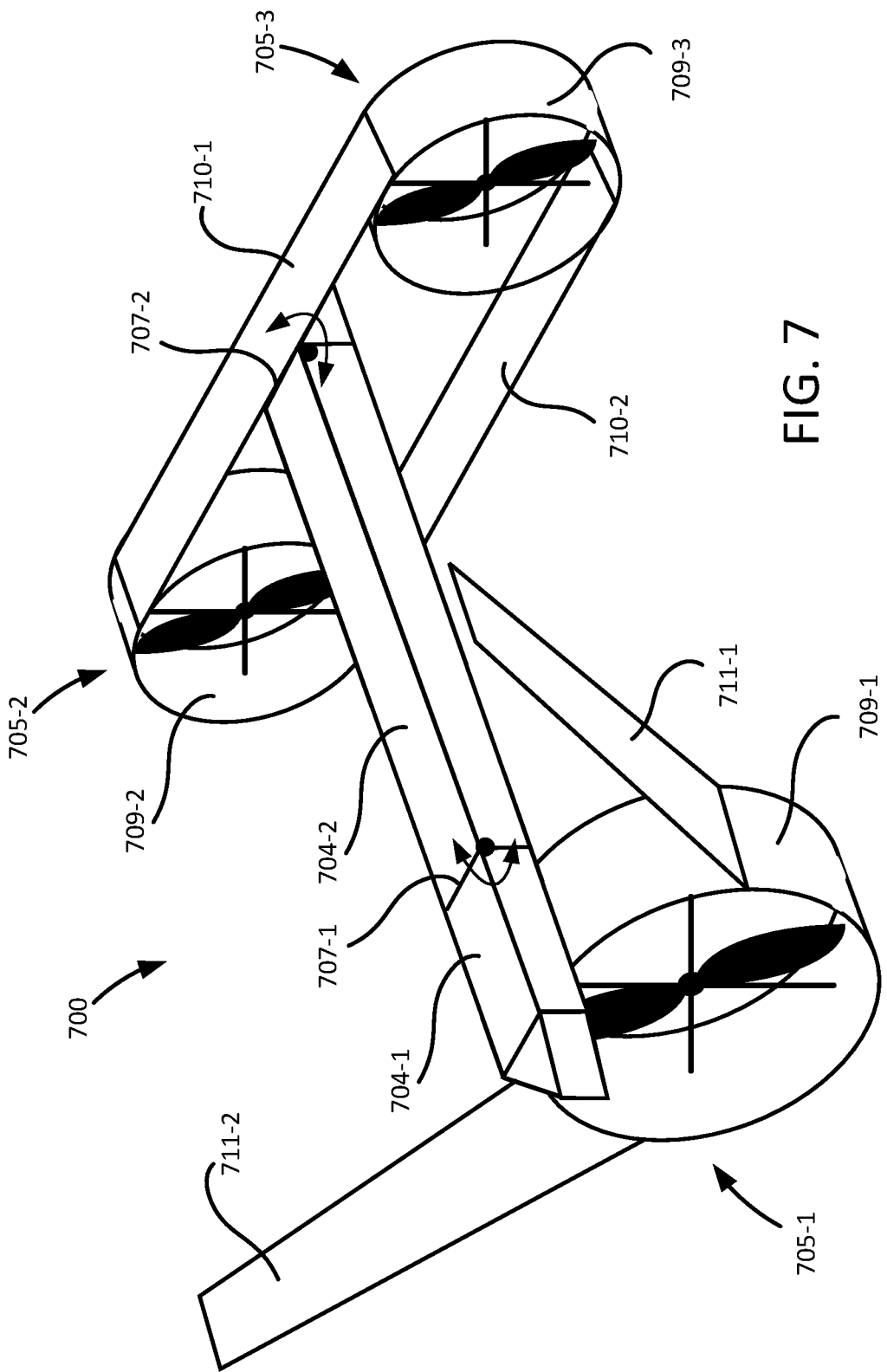
FIGS. 7-8 are illustrations of aerial vehicles with pivot assemblies in an efficiency configuration, in accordance with described implementations.
Figure 8:
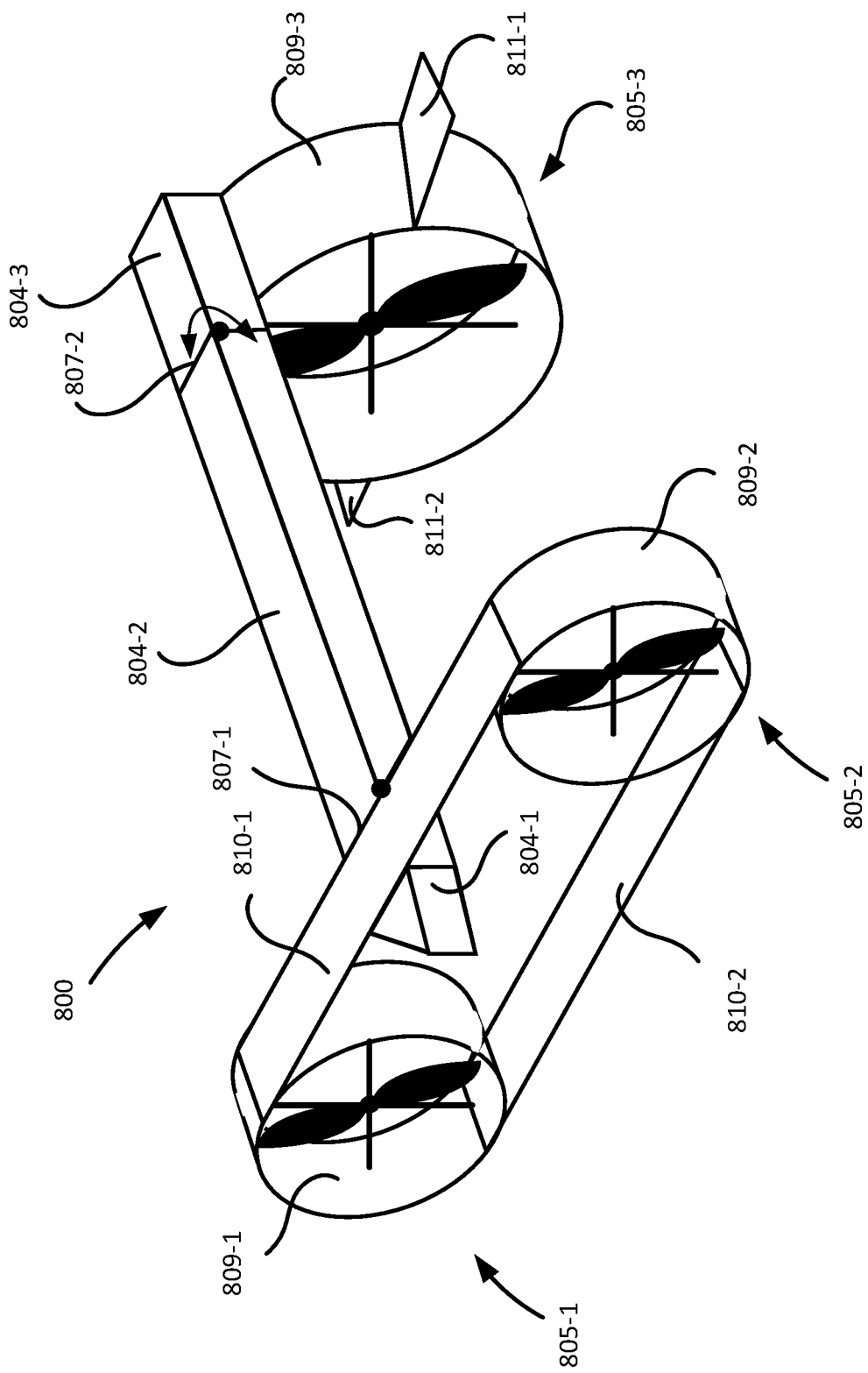

FIG. 7 and FIG. 8 illustrate still further configurations of an aerial vehicle that includes pivot assemblies that are operable to adjust the configuration of the aerial vehicle between a maneuverability configuration and an efficiency configuration. Except where otherwise noted, reference numerals preceded by the number "7" shown in FIG. 7 or the number "8" shown in FIG. 8 indicate components or features that are similar to components or features having reference numerals preceded by the number "1" shown in FIG. 1, reference numerals preceded by the number "2" shown in FIG. 2, reference numerals preceded by the number "3" shown in FIG. 3, reference numerals preceded by the number "4" in FIG. 4, reference numerals preceded by the number "5" in FIG. 5, and/or reference numerals preceded by the number "6" in FIG. 6.

Referring first to FIG. 7, illustrated is an aerial vehicle 700, in this example a UAV, with a first pivot assembly 707-1 in an efficiency configuration and a second pivot assembly 707-2 in an efficiency configuration, according to an implementation.

In this illustrated aerial vehicle 700, a first propulsion mechanism 705-1 is coupled to a lower side of a front-frame portion 704-1. The pivot assembly 707-1 is positioned between a front frame portion 704-1 and the mid-frame portion 704-2 such that the front frame portion 704-1 rotates about an axis of the first pivot assembly 707-1 with respect to the mid-frame portion to alter the position of the first propulsion mechanism 705-1 between an efficiency configuration (illustrated) and a maneuverability configuration in which the propulsion mechanism 705-1 is oriented to generate thrust in a substantially vertical direction.

Similar to the discussion above with respect to FIG. 6, the second pivot assembly 707-2 is coupled to a rear or tail of the frame 704 and configured to rotate the orientation of a second propulsion mechanism 705-2, a third propulsion mechanism 705-3, an upper wing 710-1 and a lower wing 710-2 between an efficiency configuration, as illustrated, and a maneuverability configuration in which the second propulsion mechanism 705-2 and the third propulsion mechanism 705-3 are oriented to produce thrust in a substantially vertical direction.

As discussed above, the pivot assemblies 707-1, 707-2 may be rotated between an efficiency configuration, as illustrated, in which the propulsion mechanisms 705 are oriented to generate a horizontal thrust, and a maneuverability configuration, in which the propulsion mechanisms 705 are oriented to generate a vertical thrust. Likewise, when the aerial vehicle 700 is in the efficiency configuration and navigating in a horizontal direction, the airflow over the airfoil shaped ducts 709-1, 709-2, and 709-3 of the propulsion mechanisms 705-1, 705-2, and 705-3, and the wings 710-1, 710-2 generate lift to improve the operating efficiency of the aerial vehicle, thereby reducing the power required to propel the aerial vehicle.

In the example illustrated in FIG. 7, in addition to the airfoil ducts 709 and wings 710, the aerial vehicle 700 includes a pair of secondary wings 711-1 and 711-2. The pair of secondary wings 711 have an airfoil shape and extend from the exterior of the duct 709-1 of the first propulsion mechanism 705-1 and provide additional lift to the aerial vehicle 700 as the aerial vehicle navigates in a horizontal direction. In addition to providing lift, the extension and position of the secondary wings 711 provide lateral stabilization to the aerial vehicle 700. In the illustrated example, the secondary wings 711 extend upward from either side of the first propulsion mechanism at approximately thirty degrees with respect to the frame 704 of the aerial vehicle. In other implementations, the secondary wings may extend at different angles, extend horizontally or extend in a downward direction with respect to the frame 704 of the aerial vehicle.

As with the other examples discussed herein, the pivot assemblies 707 may be adjusted to rotate the propulsion mechanisms mechanically (e.g., with a servo motor), pneumatically, hydraulically, etc. Likewise, the pivot assemblies 707 may include stops that stop the rotation of the pivot assembly at desired positions (maneuverability configuration, efficiency configuration). In some implementations, the pivot assemblies 707 may include a dampener, electric brake or other inertial component to control a rate of rotation of the pivot assembly. Likewise, the dampener or other inertial component may be used to position the pivot assembly 707 at other angles with respect to the frame 704 of the aerial vehicle 700.

Referring now to FIG. 8, illustrated is an aerial vehicle 800, in this example a UAV, with a first pivot assembly 807-1 in an efficiency configuration and a second pivot assembly 807-2 in an efficiency configuration, according to an implementation.

In this illustrated aerial vehicle 800, the first pivot assembly 807-1 is coupled between a front-frame portion 804-1 and a mid-frame portion 804-2 such that the front-frame portion 804-1 will rotate about an axis with respect to the mid-frame portion 804-2. An upper wing 810-1 is coupled to the front frame portion 804-1 at an approximate mid-point along the upper wing 810-1. An upper side of the first propulsion mechanism 805-1 is coupled to a first end of the upper wing 810-1 and an upper side of the second propulsion mechanism 805-2 is coupled to a second, opposing end of the upper wing 810-2, such that the first propulsion mechanism 805-1 and the second propulsion mechanism 805-2 rotate with the rotation of the first pivot assembly 807-1.

A first end of a lower wing 810-2 is coupled to a lower side of the first propulsion mechanism and a second, opposing end of the lower wing 810-2 is coupled to the lower side of the second propulsion mechanism 805-2 such that the lower wing 810-2 and the upper wing 810-1 are substantially parallel with each other. Like the other examples, the upper wing 810-1 and the lower wing 810-2 have an airfoil shape and generate lift when oriented in the efficiency configuration and the aerial vehicle 700 is navigating in a horizontal direction.

The second pivot assembly 807-2 is coupled between the mid-frame portion 804-2 and a rear-frame portion 804-3 such that the rear-frame portion 804-3 will rotate about an axis with respect to the mid-frame portion 804-2. A third propulsion mechanism 805-3 is coupled to a lower side of the rear-frame portion 804-3 such that the pivot assembly 807-2 rotates the third propulsion mechanism 805-3 between an efficiency configuration, as illustrated, and a maneuverability configuration.

As discussed above, the pivot assemblies 807-1, 807-2 may be rotated between an efficiency configuration, as illustrated, in which the propulsion mechanisms 805 are oriented to generate a horizontal thrust, and a maneuverability configuration, in which the propulsion mechanisms 805 are oriented to generate a vertical thrust. Likewise, when the aerial vehicle 800 is in the efficiency configuration and navigating in a horizontal direction, the airflow over the airfoil shaped ducts 809-1, 809-2, and 809-3 of the propulsion mechanisms 805-1, 805-2, and 805-3, and the wings 810-1, 810-2 generate lift to improve the operating efficiency of the aerial vehicle, thereby reducing the power required to propel the aerial vehicle.

In the example illustrated in FIG. 8, in addition to the airfoil ducts 809 and wings 810, the aerial vehicle 800 includes a pair of secondary wings 811-1 and 811-2. The pair of secondary wings 811 have an airfoil shape and extend from the exterior of the duct 809-3 of the third propulsion mechanism 805-3 and provide additional lift to the aerial vehicle 800 as the aerial vehicle navigates in a horizontal direction. In addition to providing lift, the extension and position of the secondary wings 811 provide lateral stabilization to the aerial vehicle 800. In the illustrated example, the secondary wings 811 extend outward in a horizontal direction from either side of the third propulsion mechanism 805-3 In other implementations, the secondary wings 811 may extend at different angles, extend in an upward direction or extend in a downward direction with respect to the frame 804 of the aerial vehicle.

As with the other examples discussed herein, the pivot assemblies 807 may be adjusted to rotate the propulsion mechanisms mechanically (e.g., with a servo motor), pneumatically, hydraulically, etc. Likewise, the pivot assemblies 807 may include stops that stop the rotation of the pivot assembly at desired positions (maneuverability configuration, efficiency configuration). In some implementations, the pivot assemblies 807 may include a dampener, electric brake or other inertial component to control a rate of rotation of the pivot assembly. Likewise, the dampener or other inertial component may be used to position the pivot assembly 807 at other angles with respect to the frame 804 of the aerial vehicle 800.

Figure 9:
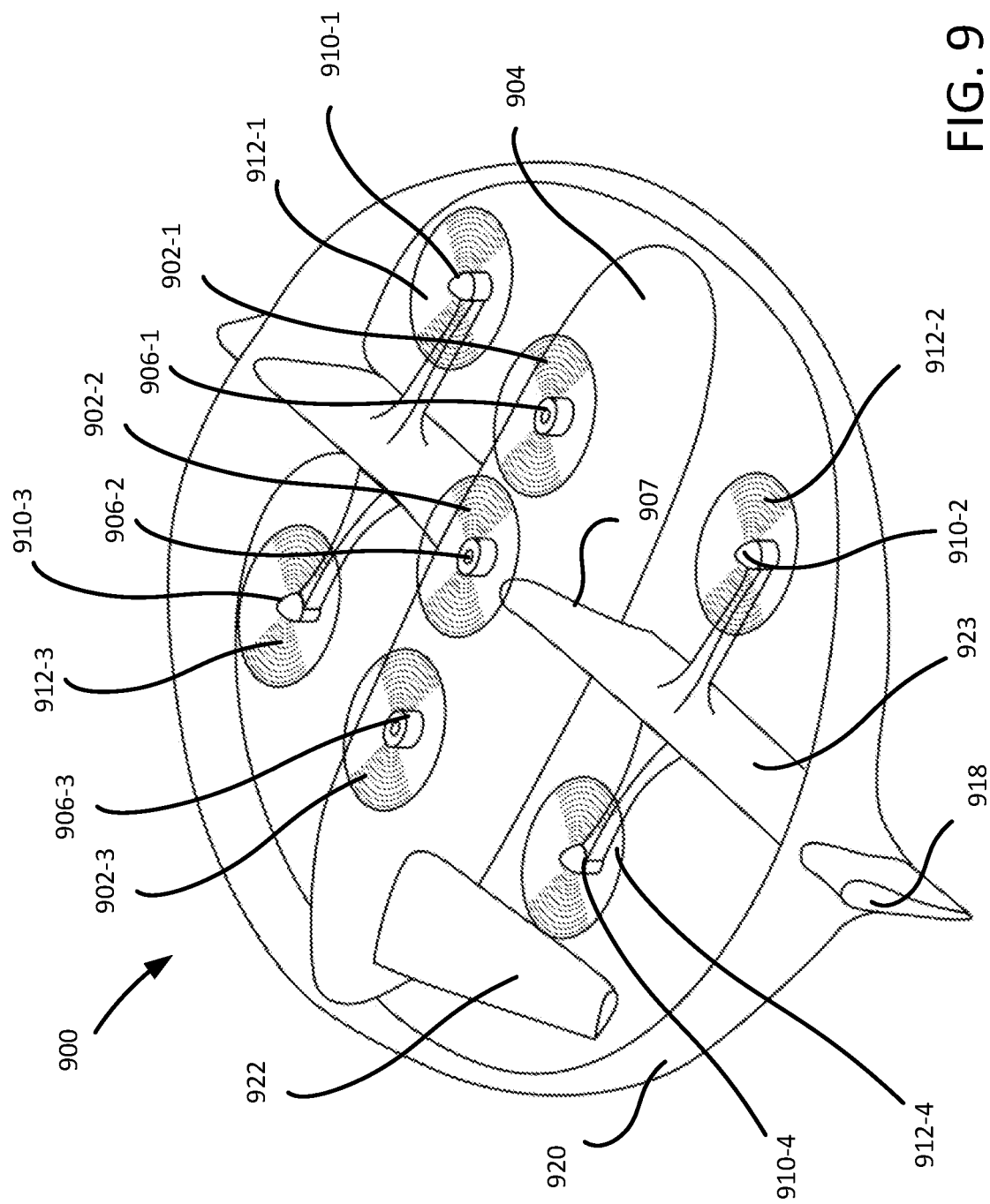
FIG. 9 is an illustration of an aerial vehicle with a pivot assembly in a maneuverability configuration, in accordance with described implementations.

FIG. 9 depicts a block diagram of another aerial vehicle 900 with a pivot assembly 907 in a maneuverability configuration, according to an implementation. Except where otherwise noted, reference numerals preceded by the number "9" shown in FIG. 9 indicate components or features that are similar to components or features having reference numerals preceded by the numbers "1," "2," "3," "4," "5," "6," "7," "8," or "9" shown in FIGS. 1-9, respectively.

Similar to the aerial vehicles discussed above, the aerial vehicle includes a frame 904, motors 906-1, 906-2, and 906-3, propellers 902-1, 902-2, 902-3, an aerial vehicle control system, power modules, payload engagement mechanism, etc. In contrast to the configurations discussed above, in this example, the lifting motors 906 are coupled to the frame 904. The aerial vehicle 900 may also include a rear wing 922 or fin that is coupled to the rear of the frame 904 of the aerial vehicle 900. The rear wing 922 may extend from either side of the rear of the frame 904 in a downward "V" configuration. The rear wing 922 may provide stabilization to the aerial vehicle 900 when the aerial vehicle is navigating in a direction that includes a horizontal component and provide a support surface that may support the rear of the aerial vehicle 900 when landed on a surface.

Figure 10:
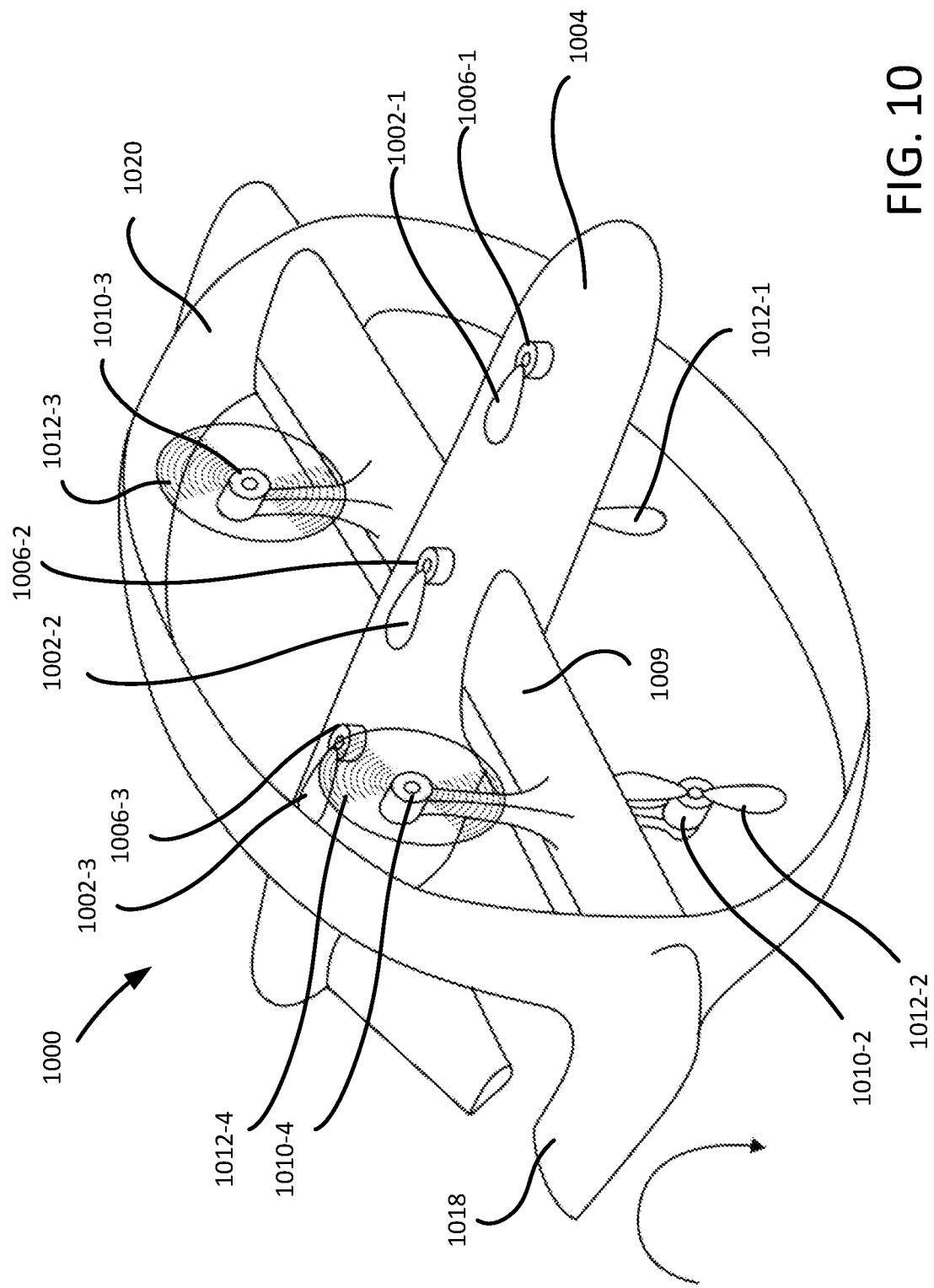
FIG. 10 is an illustration of the aerial vehicle of FIG. 9 with the pivot assembly in an efficiency configuration, in accordance with described implementations.

Similar to the implementations discussed above, coupled to the frame 904 is a pivot assembly 907 that may rotate about an axis between a maneuverability configuration, as illustrated, and an efficiency configuration (FIG. 10). In this example, coupled to the pivot assembly 907 four thrusting motors 910-1, 910-2, 910-3, and 910-4 and four corresponding thrusting propellers 912-1, 912-2, 912-3, and 912-4 that are coupled to and extend from opposing sides of the pivot arm 923. Likewise, the pivot arm 923 is coupled to either side of the pivot assembly 907, which extends through and rotates about the frame 904 of the aerial vehicle 900. The pivot arm 923 has an airfoil shape that extends in either direction horizontally away from the frame 904 of the aerial vehicle. As discussed above, the pivot assembly 907 may include stops that stop the rotation of the pivot assembly at desired positions (e.g., maneuverability configuration, efficiency configuration).

In addition to the wing shapes of the pivot arm 923, coupled to the opposing ends of each pivot arm 923 is a protective shroud 920 in the shape of a ring that encompasses the aerial vehicle 900 when the pivot assembly is in the maneuverability configuration. As illustrated, when the pivot assembly 907 is in the maneuverability configuration, each of the motors 906 and corresponding propellers 902 and the thrusting motors 910 and corresponding thrusting propellers 912 are within the perimeter of the wing 920, thereby providing protection for foreign objects that may come in contact with the aerial vehicle 900. For example, if the aerial vehicle 900, when the pivot assembly 907 is in the maneuverability configuration, impacts an object, such as a tree, the impact will be between the object and the protective shroud 920, rather than a propeller.

The protective shroud 920 may be formed of any suitable material(s) such as graphite, carbon fiber, aluminum, fiberglass, etc. Likewise, while the example illustrated in FIG. 9 shows the protective shroud in the shape of a ring, in other implementations, the protective shroud may have a different shape.

In addition to the protective shroud, the pivot assembly may include winglets 918 coupled at either end of the pivot arm 923 that extend in a substantially downward direction with respect to the frame of the aerial vehicle 900 when the pivot assembly 907 is in the illustrated maneuverability configuration. The rear wing 922 of the aerial vehicle 900 and the winglets 918 operate as support arms (or landing arms) to support the aerial vehicle 900 when it is landed on a surface.

The pivot arm 923, which is in the shape of a wing, the protective shroud 920 and the winglets 918 are coupled together and rotate between the maneuverability configuration and the efficiency configuration (FIG. 10) when the pivot assembly 907 rotates about the frame 904 of the aerial vehicle. The rotation of the pivot assembly may be mechanically (e.g., with a servo motor), pneumatically, hydraulically, etc. Alternatively, the pivot assembly 907 may be rotated based on the differential forces created by the thrusting motors 910-1, 910-2, 910-3, 910-4, and corresponding thrusting propellers 912-1, 912-2, 912-3, 912-4. Rotation of the pivot assembly 907 in response to differential forces is discussed further below.

While the example illustrated in FIG. 9 shows four thrusting motors 910-1, 910-2, 910-3, 910-4 and corresponding thrusting propellers 912-1, 912-2, 912-3, 912-4, in other implementations there may be additional or fewer thrusting motors and corresponding thrusting propellers, provided that there are at least two thrusting motors offset with respect to one another about an axis, in this example the pivot arm 923. Alternatively, if the pivot assembly 907 is rotated by means other than differential thrust (e.g., mechanically) the thrusting motors 910 and corresponding thrusting propellers 912 may be omitted and/or do not need to have two thrusting motors offset with respect to one another. Likewise, while the example illustrated in FIG. 9 shows the thrusting motors coupled to the wing shaped pivot arm 923, in other implementations, one or more of the thrusting motors and corresponding thrusting propellers may be coupled to other components that are coupled to the pivot arm. For example, one or more of the thrusting motors and corresponding thrusting propellers may be coupled to the protective shroud 920.

In the example illustrated in FIG. 9, the thrusting motor 910-1 is offset from thrusting motor 910-3 and thrusting motor 910-4. Likewise, thrusting motor 910-2 is offset from thrusting motor 910-4 and thrusting motor 910-3. Thrusting motor 910-3 is offset from thrusting motor 910-1 and thrusting motor 910-2. Thrusting motor 910-4 is offset from thrusting motor 910-2 and thrusting motor 910-1.

When the combined force generated by thrusting motor 910-1 and thrusting motor 910-2 is greater than or equal to the combined force generated by thrusting motor 910-3 and thrusting motor 910-4, the pivot assembly will remain in the maneuverability configuration, as illustrated in FIG. 9. For example, the thrusting motors 910-3, 910-4 may be disengaged and the thrusting motors 910-1, 910-2 may be engaged and generate a force by rotating the corresponding thrusting propellers 912-1, 912-2. If the combined or differential force, generated by thrusting motor 910-3 and thrusting motor 910-4 is greater than the combined force generated by thrusting motor 910-1 and thrusting motor 910-2, the pivot assembly will rotate to the efficiency configuration, as illustrated in FIG. 10.

In some implementations, the pivot assembly 907 may include a dampener, electric brake or other inertial component that requires a differential force between the offset thrusting motors to exceed a threshold before the pivot assembly 907 will rotate from the maneuverability configuration, illustrated in FIG. 9, to the efficiency configuration, illustrated in FIG. 10, or from the efficiency configuration to the maneuverability configuration. Likewise, the dampener or other inertial component may be used to position the pivot assembly 907 at other angles with respect to the frame 904 of the aerial vehicle 900.

FIG. 10 illustrates the aerial vehicle of FIG. 9 in the efficiency configuration, according to an implementation. Except where otherwise noted, reference numerals preceded by the number "10" shown in FIG. 10 indicate components or features that are similar to components or features having reference numerals preceded by the number "9" shown in FIG. 9.

When the aerial vehicle 1000 is in the efficiency configuration, one or more of the thrusting motors 1010 may be engaged to provide horizontal thrust via the corresponding thrusting propeller 1012 to propel the aerial vehicle 1000 horizontally. For example, the thrusting motors 1010-3 and 1010-4 may be engaged to generate thrust from the rotation of the corresponding thrusting propellers 1012-3 and 1012-4. Likewise, the thrusting motor 910-1 (not shown in FIG. 10) and thrusting motor 1010-2 may operate at a rotational speed that is less than thrusting motors 1010-3 and 1010-4, or the thrusting motors 910-1 and 1010-2 may be disengaged.

In this example, because the pivot arm 1009 is in the shape of a wing, when the aerial vehicle is in the efficiency configuration illustrated in FIG. 10, and the aerial vehicle 1000 moves horizontally, the wing shape of the pivot arm 1009 generates a vertical lifting force. In addition to the pivot arm having a shape of a wing, the protective shroud 1020 may also have an airfoil shape that generates vertical lift when the aerial vehicle 1000 is in the illustrated efficiency configuration and the aerial vehicle 1000 is moving in a direction that includes a horizontal component.

In some implementations, utilizing the thrusting motors 1010 and corresponding thrusting propellers 1012 in conjunction with the wing shaped pivot arm 1009 and/or the airfoil shaped protective shroud 1020 when the aerial vehicle 1000 is moving in a direction that includes a horizontal component, the rotational speed of the lifting motors 1006-1, 1006-2, and 1006-3 and corresponding lifting propellers 1002-1, 1002-2, and 1002-3 may be reduced or eliminated as the wing shape of the pivot arm 1009 and/or the airfoil shape of the protective shroud 1020 may provide sufficient lift and keep the aerial vehicle 1000 airborne when thrust in a horizontal direction by the thrusting motors 1010 and thrusting propellers 1012 is applied.

In the example illustrated in FIG. 10, the rotation of the lifting motors 1006 and corresponding lifting propellers has been disengaged and the lift is provided by the wing shape of the pivot arm and the airfoil shape of the protective shroud 1020. Likewise, the lifting propellers 1002 in this example are single blade propellers and align with the direction of horizontal flight to reduce drag as the aerial vehicle 1000 navigates in a horizontal direction. In a similar manner, the thrusting motor 1010-2 and thrusting motor 910-1 (not shown in FIG. 10) have likewise been disengaged and the horizontal thrust is provided by the rotation of the thrusting motor 1010-3 and thrusting motor 1010-4. Likewise, the thrusting propeller 1012-2 and thrusting propeller 1012-1 are folding blade propellers such that they fold in a direction of the wind when not rotating, thereby reducing drag on the aerial vehicle 1000 when the aerial vehicle 1000 is moving in a direction that includes a horizontal component.

When the aerial vehicle 1000 is in the efficiency configuration, the winglet 1018 and a portion of the protective shroud that extends from either side of the pivot arm 1009 act as stabilizers for the aerial vehicle 1000 when the aerial vehicle is moving in a direction that includes a horizontal component.

The wing shape of the pivot arm 1009, the protective shroud 1020 and the winglets 1018 may be formed of any suitable material such as, but not limited to, carbon fiber, aluminum, graphite, plastic, fiberglass, etc.

Figure 11:
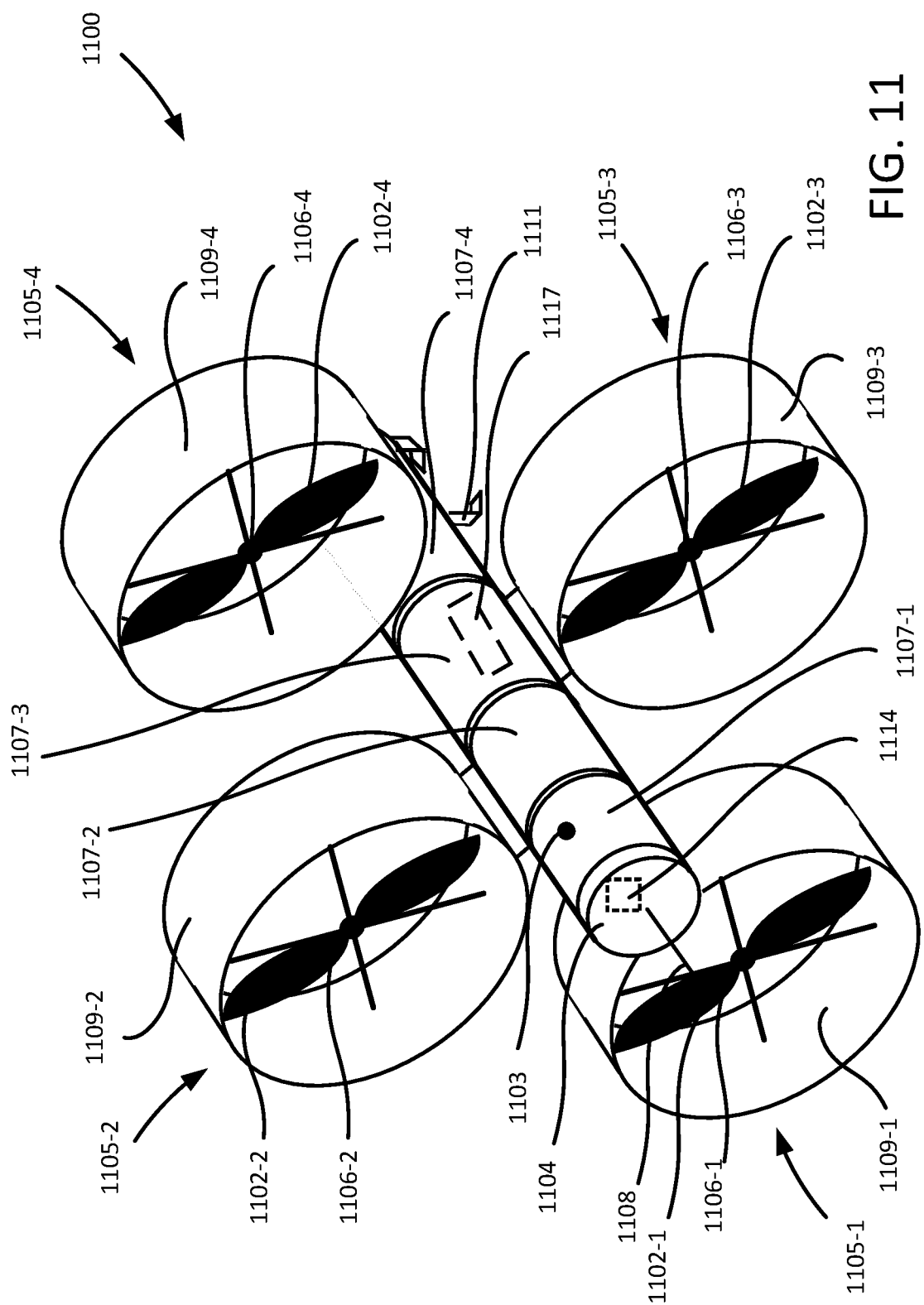
FIG. 11 is an illustration of an aerial vehicle with pivot assemblies in a maneuverability configuration, in accordance with described implementations.

FIG. 11 is an illustration of an aerial vehicle 1100 with pivot assemblies 1107-1, 1107-2, 1107-3, and 1107-4 in a maneuverability configuration, in accordance with described implementations. As illustrated, the aerial vehicle 1100 includes a frame 1104. The frame 1104 or body of the aerial vehicle 1100 may be formed of any suitable material, such as graphite, carbon fiber, aluminum, etc., or any combination thereof. In this example, the frame 1104 of the aerial vehicle 1100 is formed of machined aluminum in a cylindrical shape.

In the maneuverability configuration illustrated in FIG. 11, the propulsion mechanisms 1105 are oriented around the frame 1104 in a pattern such that there is little to no overlap in the propulsion mechanisms. As such, the propulsion mechanisms 1105 form a stacked quad-copter configuration.

The first pivot assembly 1107-1 is mounted around the perimeter of the front of the frame 1104 and is used to alter the position of a first propulsion mechanism 1105-1. A second pivot assembly 1107-2 is mounted around the perimeter of the frame 1104, adjacent the first pivot assembly 1107-1 and is used to alter the position of a second propulsion mechanism 1105-2. A third pivot assembly 1107-3 is mounted around the perimeter of the frame 1104, adjacent the second pivot assembly 1107-2 and is used to alter the position of a third propulsion mechanism 1105-3. A fourth pivot assembly 1107-4 is mounted around the perimeter of the frame 1104, adjacent the third pivot assembly 1107-3 and is used to alter the position of a fourth propulsion mechanism 1105-4.

In this example, the propulsion mechanisms 1105 each include a motor 1106 and a propeller 1102. For example, the first propulsion mechanism includes a first motor 1106-1 and a first propeller 1102-1, the second propulsion mechanism includes a second motor 1106-2 and a second propeller 1102-2, the third propulsion mechanism includes a third motor 1106-3 and a third propeller 1102-3, and the fourth propulsion mechanism includes a fourth motor 1106-4 and a fourth propeller 1102-4. Any form of motor and/or propeller may be used in the described examples. In one implementation, the motors are outrunner brushless motors and the propellers are twenty-four-inch carbon fiber propellers. In other implementations, other forms of motors and/or propellers may likewise be utilized. For example, the motors may be inrunner brushless motors, or brushed motors. Likewise, the propellers may be formed of graphite, wood, etc. In still other implementations, rather than motors and corresponding propellers, in some implementations, the propulsion mechanisms 1105 may include fans, jets, turbojets, turbo fans, jet engines, internal combustion engines, and the like (either with propellers or other devices) to provide lifting forces and/or thrusting forces for the aerial vehicle.

Each propulsion mechanism 1105 may also include a duct 1109 that surrounds the motor 1106 and propeller 1102 to form a ducted propulsion mechanism 1105. For example, the first propulsion mechanism 1105-1 may include a first duct 1109-1 that surrounds the first motor 1106-1 and the first propeller 1102-1, the second propulsion mechanism 1105-2 may include a second duct 1109-2 that surrounds the second motor 1106-2 and the second propeller 1102-2, the third propulsion mechanism 1105-3 may include a third duct 1109-3 that surrounds the third motor 1106-3 and the third propeller 1102-3, and the fourth propulsion mechanism 1105-4 may include a fourth duct 1109-4 that surrounds the fourth motor 1106-4 and the fourth propeller 1102-4. As is known, when propellers are ducted, the thrust generated by the propeller at the same power level is increased compared to the same propeller at the same power level without a duct.

The propulsion mechanisms 1105 may all be of the same or similar size. Alternatively, some or all the propulsion mechanisms may be different sizes. For example, the first propulsion mechanism 1105-1 may be the smallest, the second propulsion mechanism 1105-2 may be the second smallest, the third propulsion mechanism 1105-3 may be the third smallest, and the fourth propulsion mechanism 1105-4 the largest. In other configurations, different propulsion mechanisms may be different sizes than those discussed. Likewise, while this example includes four propulsion mechanisms, more or fewer propulsion mechanisms may be utilized. For example, by extending the length of the cylindrical shaped frame 1104, additional pivot assemblies 1107 may be coupled to the perimeter of the frame 1104 and be configured to rotate additional propulsion mechanisms with respect to the frame 1104. Likewise, in some implementations, the propulsion mechanisms may be positioned at different locations on the aerial vehicle 1100.

Mounted to a first end, or front end, of the frame 1104 of the aerial vehicle 1100 is one or more antennas 1108. The antennas 1108 may be used to transmit and/or receive wireless communications. For example, the antennas 1108 may be utilized for Wi-Fi, satellite, near field communication ("NFC"), cellular communication, or any other form of wireless communication. Other components, such as cameras, time of flight sensors, distance determining elements, gimbals, etc., may likewise be mounted to the frame 1104 of the aerial vehicle 1100.

An aerial vehicle control system 1114 is also mounted to the frame 1104. In this example, the aerial vehicle control system 1114 is mounted toward the front of the frame 1104. In other implementations, the aerial vehicle control system 1114, or components thereof, may be mounted or positioned at other locations of the aerial vehicle 1100. The aerial vehicle control system 1114, as discussed in further detail below with respect to FIG. 16, controls the operation, routing, navigation, communication, motor controls, the payload engagement mechanism, and pivot assemblies of the aerial vehicle 1100.

Likewise, the aerial vehicle 1100 includes one or more power modules 1117. The power modules may be mounted at various locations on the frame 1104 of the aerial vehicle 1100. For example, in some implementations, four power modules may be positioned inside the cylindrical frame 1104. The power modules for the aerial vehicle 1100 may be in the form of battery power, solar power, gas power, super capacitor, fuel cell, alternative power generation source, or a combination thereof. For example, the power modules may each be a lithium-ion polymer battery, or polymer lithium ion (Li-poly, Li-Pol, LiPo, LIP, PLI or Lip) battery. The power module(s) are coupled to and provide power for the aerial vehicle control system 1114, the propulsion mechanisms 1105, the payload engagement mechanism, the pivot assemblies 1107, etc.

In some implementations, one or more of the power modules may be configured such that it can be autonomously removed and/or replaced with another power module while the aerial vehicle is landed or in flight. For example, when the aerial vehicle 1100 lands at a location, the aerial vehicle may engage with a charging member at the location that will recharge the power module.

As mentioned above, the aerial vehicle 1100 may also include a payload engagement mechanism 1111. The payload engagement mechanism may be configured to engage and disengage a payload (e.g., an item or a container that contains items). In other implementations, the payload engagement mechanism may operate as the container, in which it contains item(s). In this example, the payload engagement mechanism is positioned beneath the frame 1104 of the aerial vehicle 1100. The payload engagement mechanism communicates with (via wired or wireless communication) and is controlled by the aerial vehicle control system 1114. In some implementations, the payload engagement mechanism 1111 may be coupled to the frame 1104 between the pivot assemblies so that the payload engagement mechanism does not rotate with a rotation of the pivot assemblies and maintains a payload regardless of the position of the pivot assemblies and propulsion mechanisms.

Also coupled to the frame 1104 is the first pivot assembly 1107-1. In this example, the first pivot assembly 1107-1 is coupled to and surrounds a perimeter of the front of the frame 1104. The rotation of the first pivot assembly around the frame 1104 controls rotation of the first propulsion mechanism 1105-1. The first propulsion mechanism 1105-1 is coupled to the first pivot assembly 1107-1 and is configured to rotate about the frame 1104 of the aerial vehicle 1100. The pivot assembly 1107 may be adjusted to rotate the propulsion mechanisms mechanically (e.g., with a servo motor), pneumatically, hydraulically, etc. Likewise, the pivot assembly 1107-1 may include stops that stop the rotation of the pivot assembly at desired positions (maneuverability configuration, efficiency configuration). In some implementations, the pivot assembly 1107 may include a dampener, electric brake or other inertial component to control a rate of rotation of the pivot assembly. Likewise, the dampener or other inertial component may be used to position the pivot assembly 1107 at other angles with respect to the frame 1104 of the aerial vehicle 1100.

In other implementations, the pivot assembly 1107-1 may include a locking pin 1103 that may be extended to engage with and lock the first pivot assembly 1107-1 into place with respect to the frame 1104 or retracted so that the pivot assembly 1107-1 can rotate about the frame 1104. For example, the locking pin 1103 may be mechanically spring activated and the frame 1104 may include one or more grooves or openings into which the pin 1103 may be extended to lock the pivot assembly into place with respect to the frame 1104. In comparison, when the pin is retracted from the frame 1104, the pivot assembly is able to rotate about the frame. In one implementation, when the pin is retracted, the rotational force from the rotation of the propeller blade 1102-1 will cause the propulsion mechanism 1105-1 to rotate about the frame in a direction of the force. When the propulsion mechanism has reached a desired position, the pin is extended locking the rotation pivot assembly 1107-1 and the first propulsion mechanism 1105-1 into place with respect to the frame.

Also coupled to the frame 1104 is the second pivot assembly 1107-2. In this example, the second pivot assembly 1107-2 is coupled to and surrounds a perimeter of the frame 1104 and is adjacent the first pivot assembly 1107-1. The rotation of the second pivot assembly around the frame 1104 controls rotation of the second propulsion mechanism 1105-2. The second propulsion mechanism 1105-2 is coupled to the second pivot assembly 1107-2 and is configured to rotate about the frame 1104 of the aerial vehicle 1100. The pivot assembly 1107 may be adjusted to rotate the propulsion mechanisms mechanically (e.g., with a servo motor), pneumatically, hydraulically, etc. Likewise, the pivot assembly 1107-2 may include stops that stop the rotation of the pivot assembly at desired positions (maneuverability configuration, efficiency configuration). In some implementations, the pivot assembly 1107 may include a dampener, electric brake or other inertial component to control a rate of rotation of the pivot assembly. Likewise, the dampener or other inertial component may be used to position the pivot assembly 1107 at other angles with respect to the frame 1104 of the aerial vehicle 1100.

In other implementations, the pivot assembly 1107-2 may include a locking pin that may be extended to engage with and lock the second pivot assembly 1107-2 into place with respect to the frame 1104 or retracted so that the pivot assembly 1107-2 can rotate about the frame 1104. In one implementation, when the pin is retracted, the rotational force from the rotation of the propeller blade 1102-2 will cause the propulsion mechanism 1105-2 to rotate about the frame in a direction of the force. When the propulsion mechanism has reached a desired position, the pin is extended locking the rotation of the pivot assembly 1107-2 and the second propulsion mechanism 1105-2 into place.

Also coupled to the frame 1104 is the third pivot assembly 1107-3. In this example, the third pivot assembly 1107-3 is coupled to and surrounds a perimeter of the frame 1104 and is adjacent the second pivot assembly 1107-2. The rotation of the third pivot assembly around the frame 1104 controls rotation of the third propulsion mechanism 1105-3. The third propulsion mechanism 1105-3 is coupled to the third pivot assembly 1107-3 and is configured to rotate about the frame 1104 of the aerial vehicle 1100. The pivot assembly 1107 may be adjusted to rotate the propulsion mechanism mechanically (e.g., with a servo motor), pneumatically, hydraulically, etc. Likewise, the pivot assembly 1107-3 may include stops that stop the rotation of the pivot assembly at desired positions (maneuverability configuration, efficiency configuration). In some implementations, the pivot assembly 1107 may include a dampener, electric brake or other inertial component to control a rate of rotation of the pivot assembly. Likewise, the dampener or other inertial component may be used to position the pivot assembly 1107 at other angles with respect to the frame 1104 of the aerial vehicle 1100.

In other implementations, the pivot assembly 1107-3 may include a locking pin that may be extended to engage with and lock the second pivot assembly 1107-3 into place with respect to the frame 1104 or retracted so that the pivot assembly 1107-3 can rotate about the frame 1104. In one implementation, when the pin is retracted, the rotational force from the rotation of the propeller blade 1102-3 will cause the propulsion mechanism 1105-3 to rotate about the frame in a direction of the force. When the propulsion mechanism has reached a desired position, the pin is extended locking the rotation of the pivot assembly 1107-3 and the second propulsion mechanism 1105-3 into place.

Also coupled to the frame 1104 is the fourth pivot assembly 1107-4. In this example, the fourth pivot assembly 1107-4 is coupled to and surrounds a perimeter of the frame 1104 and is adjacent the third pivot assembly 1107-3. The rotation of the fourth pivot assembly around the frame 1104 controls rotation of the fourth propulsion mechanism 1105-4. The fourth propulsion mechanism 1105-4 is coupled to the fourth pivot assembly 1107-4 and is configured to rotate about the frame 1104 of the aerial vehicle 1100. The pivot assembly 1107 may be adjusted to rotate the propulsion mechanism mechanically (e.g., with a servo motor), pneumatically, hydraulically, etc. Likewise, the pivot assembly 1107-4 may include stops that stop the rotation of the pivot assembly at desired positions (maneuverability configuration, efficiency configuration). In some implementations, the pivot assembly 1107 may include a dampener, electric brake or other inertial component to control a rate of rotation of the pivot assembly. Likewise, the dampener or other inertial component may be used to position the pivot assembly 1107 at other angles with respect to the frame 1104 of the aerial vehicle 1100.

In other implementations, the pivot assembly 1107-4 may include a locking pin that may be extended to engage with and lock the fourth pivot assembly 1107-4 into place with respect to the frame 1104 or retracted so that the pivot assembly 1107-4 can rotate about the frame 1104. In one implementation, when the pin is retracted, the rotational force from the rotation of the propeller blade 1102-4 will cause the propulsion mechanism 1105-4 to rotate about the frame in a direction of the force. When the propulsion mechanism has reached a desired position, the pin is extended locking the rotation of the pivot assembly 1107-4 and the fourth propulsion mechanism 1105-4 into place.

When the aerial vehicle is configured in the maneuverability configuration, the propulsion mechanisms are oriented to produce a vertical thrust that enables VTOL and/or rapid maneuvering in any direction. Likewise, the aerial vehicle, when in the maneuverability configuration can hover, pitch, yaw, roll, etc., in any direction.

Figure 12:
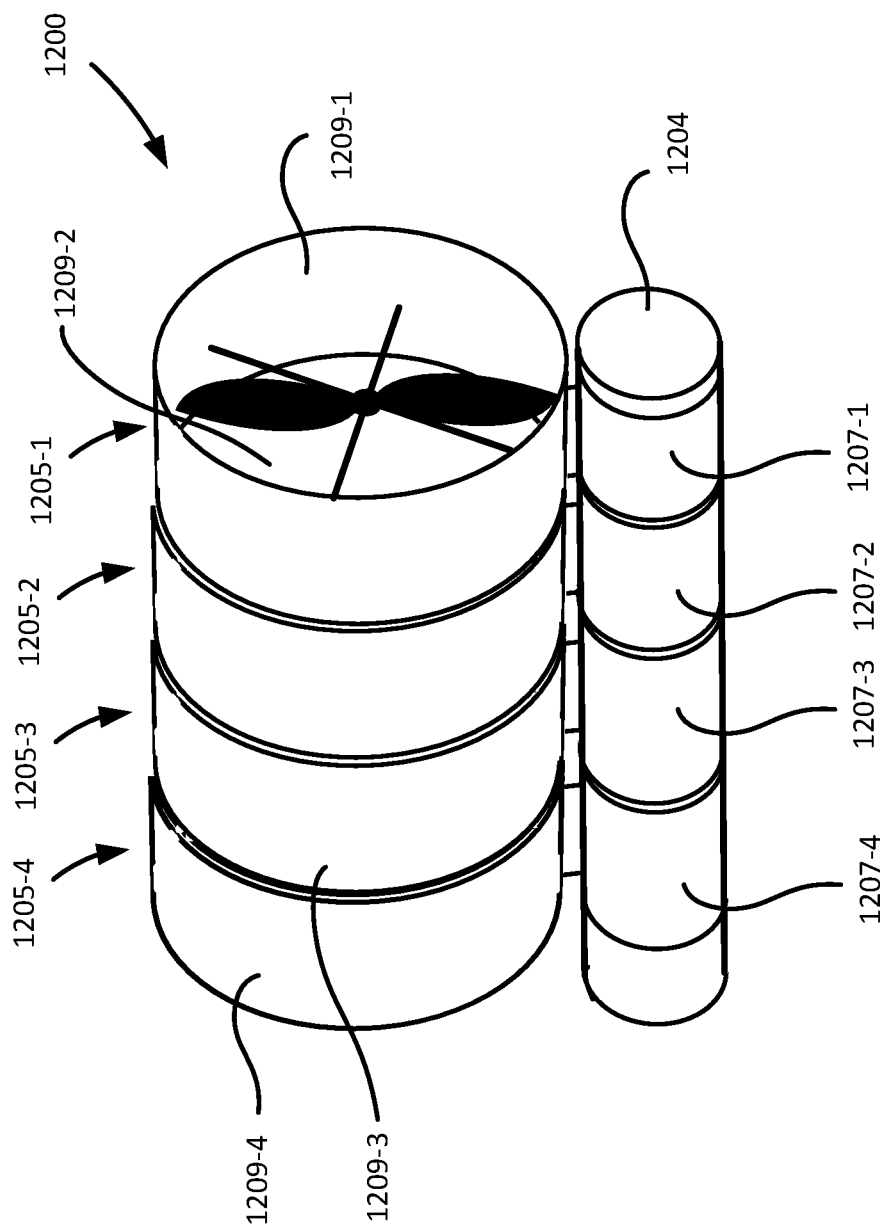
FIG. 12 is an illustration of the aerial vehicle of FIG. 11 with the pivot assemblies in an efficiency configuration, in accordance with described implementations.

FIG. 12 is an illustration of the aerial vehicle 1100 of FIG. 11 with the pivot assemblies 1207 in an efficiency configuration, in accordance with described implementations. Except where otherwise noted, reference numerals preceded by the number "12" shown in FIG. 12 indicate components or features that are similar to components or features having reference numerals preceded by the number "11" shown in FIG. 11.

When the pivot assemblies 1207-1, 1207-2, 1207-3, and 1207-4 are rotated into the efficiency configuration, as illustrated in FIG. 12, the propulsion mechanisms 1205-1, 1205-2, 1205-3, and 1205-4 are aligned to form a column, thereby reducing the profile of the aerial vehicle 1200. Likewise, the ducts 1209-1, 1209-2, 1209-3, and 1209-4 of each propulsion mechanism 1205-1, 1205-2, 1205-3, and 1205-4 are aligned to form a single long duct column that surrounds each of the motors and propellers of the propulsion mechanisms 1205 of the aerial vehicle 1200. Because the ducts 1209-1, 1209-2, 1209-3, and 1209-4 have an airfoil shape, when aligned in a column and the aerial vehicle 1200 is operating in a horizontal direction, the airflow passing over and through the ducts 1209 produces a vertical lift, thereby maintaining altitude of the aerial vehicle 1200.

The aligned position of the propulsion mechanisms 1205, as illustrated in FIG. 12 to generate horizontal thrust and the lift produced from the airfoil shaped ducts, reduces the power required to propel the aerial vehicle 1200 during horizontal flight. Likewise, the rotation of the aerial vehicle toward a direction of travel in a horizontal direction, as illustrated in FIG. 12, reduces the drag and profile of the aerial vehicle that would result during horizontal flight if the propulsion mechanisms were not aligned and the aerial vehicle continued to operate in the maneuverability configuration illustrated with respect to FIG. 11. Specifically, if the propulsion mechanisms remained in the maneuverability configuration, drag would result from the ducts during horizontal flight. Likewise, to generate the necessary horizontal force to propel the aerial vehicle in a horizontal direction, the aerial vehicle would have to operate with a forward pitch, thereby increasing the profile of the aerial vehicle and the resulting drag. In comparison, by aligning the propulsion mechanisms 1205 with the pivot assemblies 1207 into the efficiency configuration and rotating the orientation of the aerial vehicle 1200, the drag from the ducts is converted into lift as the air passes over and through the airfoil shape of the ducts 1209. Likewise, because the aerial vehicle is rotated so that the propulsion mechanisms 1205 produce horizontal thrust, the aerial vehicle 1100 can navigate with less of a forward pitch, or no forward pitch, thereby reducing the profile of the aerial vehicle and resulting drag.

While the implementations of the aerial vehicles discussed herein utilize propulsion mechanisms in the form of propellers, motors, and ducts, to achieve and maintain flight, in other implementations, the aerial vehicle may be configured in other manners. For example, the aerial vehicle may include fixed wings and/or a combination of both propulsion mechanisms and fixed wings.

Figure 13:
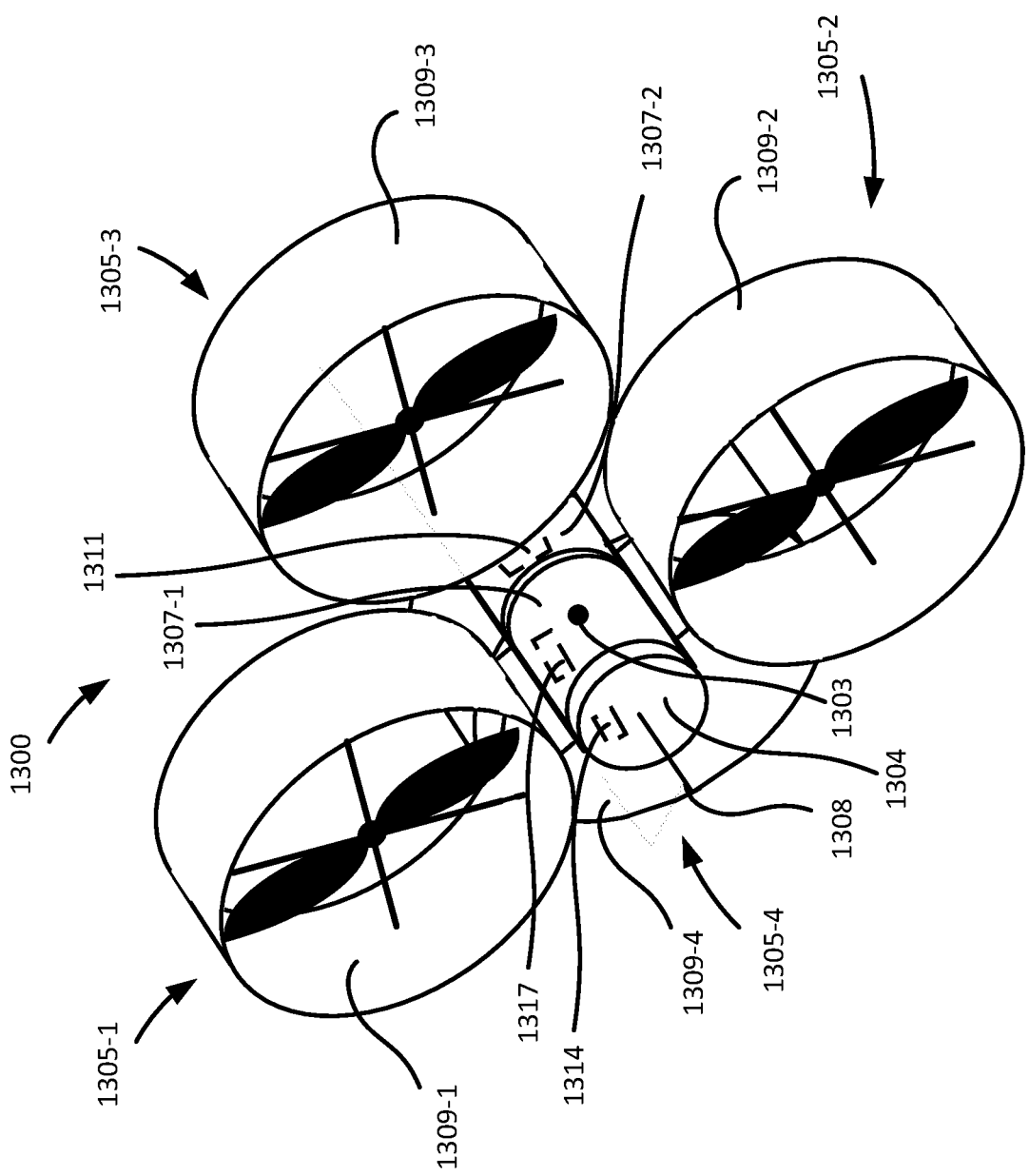
FIG. 13 is an illustration of an aerial vehicle with pivot assemblies in a maneuverability configuration, in accordance with described implementations.

FIG. 13 is an illustration of an aerial vehicle 1300 with pivot assemblies 1307-1, and 1307-2 in a maneuverability configuration, in accordance with described implementations. As illustrated, the aerial vehicle 1300 includes a frame 1304. The frame 1304 or body of the aerial vehicle 1300 may be formed of any suitable material, such as graphite, carbon fiber, aluminum, etc., or any combination thereof. In this example, the frame 1304 of the aerial vehicle 1300 is formed of machined aluminum in a cylindrical shape.

In the maneuverability configuration illustrated in FIG. 13, the propulsion mechanisms 1305 are oriented around the frame 1304 in a pattern such that there is little to no overlap in the propulsion mechanisms. As such, the propulsion mechanisms 1305 form a stacked quad-copter configuration.

The first pivot assembly 1307-1 is mounted around the perimeter of the front of the frame 1304 and is used to alter the position of a first propulsion mechanism 1305-1 and the second propulsion mechanism 1305-2. A second pivot assembly 1307-2 is mounted around the perimeter of the frame 1304, adjacent the first pivot assembly 1307-1 and is used to alter the position of a third propulsion mechanism 1305-3 and the fourth propulsion mechanism 1305-4.

In the illustrated example, the pairs of propulsion mechanisms, the first propulsion mechanism 1305-1 and second propulsion mechanism 1305-2 coupled to the first pivot assembly 1307-1 and the third propulsion mechanism 1305-3 and fourth propulsion mechanism 1305-4 coupled to the second pivot assembly 1307-2, are aligned on opposite sides of the respective pivot assemblies. For example, the first propulsion mechanism 1305-1 and the second propulsion mechanism 1305-2 are approximately one-hundred and eighty degrees offset about the perimeter of the first pivot assembly 1307-1 and the third propulsion mechanism 1305-3 and the fourth propulsion mechanism 1305-4 are approximately one-hundred and eighty degrees offset about the perimeter of the second pivot assembly 1307-2. Likewise, when the aerial vehicle 1300 is in the illustrated maneuverability configuration, the first pivot assembly 1307-1 is offset approximately ninety degrees with respect to the second pivot assembly 1307-2 so that the propulsion mechanisms 1305 do not substantially overlap and form a stacked quad-copter configuration.

When the aerial vehicle is configured in the maneuverability configuration, the propulsion mechanisms are oriented to produce a vertical thrust that enables VTOL and/or rapid maneuvering in any direction. Likewise, the aerial vehicle, when in the maneuverability configuration, can hover, pitch, yaw, roll, etc., in any direction.

Figure 14:
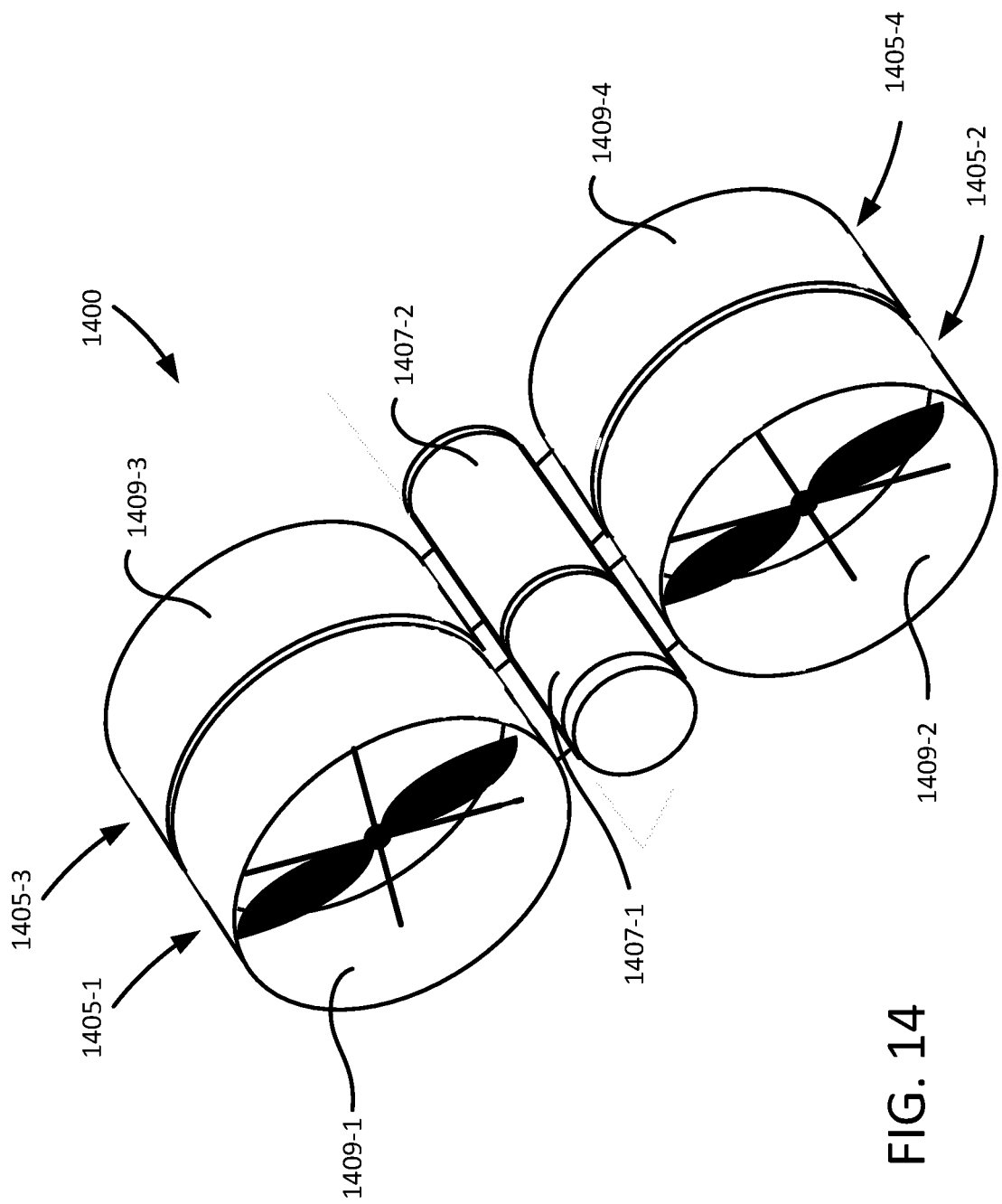
FIG. 14 is an illustration of the aerial vehicle of FIG. 13 with the pivot assemblies in an efficiency configuration, in accordance with described implementations.

Like the example illustrated with respect to FIGS. 11 and 12, the aerial vehicle discussed with respect to FIGS. 13 and 14 may include propulsion mechanisms that utilize propellers and motors to generate vertical forces and/or thrusting forces. While the illustrated examples describe the use of motors and propellers, in other implementations, the propulsion mechanisms 1305 may include fans, jets, turbojets, turbo fans, jet engines, internal combustion engines, and the like (either with propellers or other devices) to provide lifting forces and/or thrusting forces for the aerial vehicle.

Each propulsion mechanism 1305 may also include a duct 1309 that surrounds the motor and propeller to form a ducted propulsion mechanism 1305. For example, the first propulsion mechanism 1305-1 may include a first duct 1309-1, the second propulsion mechanism 1305-2 may include a second duct 1309-2, the third propulsion mechanism 1305-3 may include a third duct 1309-3, and the fourth propulsion mechanism 1305-4 may include a fourth duct 1309-4. As is known, when propellers are ducted, the thrust generated by the propeller at the same power level is increased compared to the same propeller at the same power level without a duct.

The propulsion mechanisms 1305 may all be of the same or similar size. Alternatively, some or all the propulsion mechanisms may be different sizes. For example, the first propulsion mechanism 1305-1 and the second propulsion mechanism 1305-2 may be smaller than the third propulsion mechanism 1305-3 and the fourth propulsion mechanism 1305-4. In other configurations, different propulsion mechanisms may be different sizes than those discussed. Likewise, while this example includes four propulsion mechanisms, more or fewer propulsion mechanisms may be utilized.

Mounted to a first end, or front end, of the frame 1304 of the aerial vehicle 1300 is one or more antennas 1308. The antennas 1308 may be used to transmit and/or receive wireless communications. For example, the antennas 1308 may be utilized for Wi-Fi, satellite, near field communication ("NFC"), cellular communication, or any other form of wireless communication. Other components, such as cameras, time of flight sensors, distance determining elements, gimbals, etc., may likewise be mounted to the frame 1304 of the aerial vehicle 1300.

An aerial vehicle control system 1314 is also mounted to the frame 1304. In this example, the aerial vehicle control system 1314 is mounted toward the front of the frame 1304. In other implementations, the aerial vehicle control system 1314, or components thereof, may be mounted or positioned at other locations of the aerial vehicle 1300. The aerial vehicle control system 1314, as discussed in further detail below with respect to FIG. 16, controls the operation, routing, navigation, communication, motor controls, the payload engagement mechanism, and pivot assemblies of the aerial vehicle 1300.

Likewise, the aerial vehicle 1300 includes one or more power modules 1317. The power modules may be mounted at various locations on the frame 1304 of the aerial vehicle 1300. For example, in some implementations, four power modules may be positioned inside the cylindrical frame 1304. The power modules for the aerial vehicle 1300 may be in the form of battery power, solar power, gas power, super capacitor, fuel cell, alternative power generation source, or a combination thereof. For example, the power modules may each be a lithium-ion polymer battery, or polymer lithium ion (Li-poly, Li-Pol, LiPo, LIP, PLI or Lip) battery. The power module(s) are coupled to and provide power for the aerial vehicle control system 1314, the propulsion mechanisms 1305, the payload engagement mechanism, the pivot assemblies 1307, etc.

In some implementations, one or more of the power modules may be configured such that it can be autonomously removed and/or replaced with another power module while the aerial vehicle is landed or in flight. For example, when the aerial vehicle 1300 lands at a location, the aerial vehicle may engage with a charging member at the location that will recharge the power module.

As mentioned above, the aerial vehicle 1300 may also include a payload engagement mechanism 1311. The payload engagement mechanism may be configured to engage and disengage a payload (e.g., an item or a container that contains items). In other implementations, the payload engagement mechanism may operate as the container, in which it contains item(s). In this example, the payload engagement mechanism 1311 is positioned within the interior of the frame 1304 of the aerial vehicle 1300. The payload engagement mechanism communicates with (via wired or wireless communication) and is controlled by the aerial vehicle control system 1314.

Also coupled to the frame 1304 is the first pivot assembly 1307-1. In this example, the first pivot assembly 1307-1 is coupled to and surrounds a perimeter of the front of the frame 1304. The rotation of the first pivot assembly around the frame 1304 controls rotation of the first propulsion mechanism 1305-1 and the second propulsion mechanism 1305-2. The first propulsion mechanism 1305-1 and the second propulsion mechanism 1305-2 are coupled to the first pivot assembly 1307-1 and configured to rotate about the frame 1304 of the aerial vehicle 1300. The pivot assembly 1307 may be adjusted to rotate the propulsion mechanisms mechanically (e.g., with a servo motor), pneumatically, hydraulically, etc. Likewise, the pivot assembly 1307-1 may include stops that stop the rotation of the pivot assembly at desired positions (maneuverability configuration, efficiency configuration). In some implementations, the pivot assembly 1307 may include a dampener, electric brake or other inertial component to control a rate of rotation of the pivot assembly. Likewise, the dampener or other inertial component may be used to position the pivot assembly 1307 at other angles with respect to the frame 1304 of the aerial vehicle 1300.

In other implementations, the pivot assembly 1307-1 may include a locking pin 1303 that may be extended to engage with and lock the first pivot assembly 1307-1 into place with respect to the frame 1304 or retracted so that the pivot assembly 1307-1 can rotate about the frame 1304. For example, the locking pin 1303 may be mechanically spring activated and the frame 1304 may include one or more grooves or openings into which the pin 1303 may be extended to lock the pivot assembly into place with respect to the frame 1304. In comparison, when the pin is retracted from the frame 1304, the pivot assembly is able to rotate about the frame. In one implementation, when the pin 1303 is retracted, the rotational force from the rotation of the propeller blades of the first propulsion mechanism 1305-1 and/or the second propulsion mechanism 1305-2 will cause the propulsion mechanism 1305-1 to rotate about the frame in a direction of the force. When the propulsion mechanism has reached a desired position, the pin is extended locking the rotation pivot assembly 1307-1, the first propulsion mechanism 1305-1 and the second propulsion mechanism 1305-2 into place with respect to the frame 1304.

Also coupled to the frame 1304 is the second pivot assembly 1307-2. In this example, the second pivot assembly 1307-2 is coupled to and surrounds a perimeter of the frame 1304 and is adjacent the first pivot assembly 1307-1. The rotation of the second pivot assembly around the frame 1304 controls rotation of the third propulsion mechanism 1305-3 and the fourth propulsion mechanism 1305-4. The third propulsion mechanism 1305-3 and the fourth propulsion mechanism 1305-4 are coupled to the second pivot assembly 1307-2 and are configured to rotate about the frame 1304 of the aerial vehicle 1300. The pivot assembly 1307 may be adjusted to rotate the propulsion mechanisms mechanically (e.g., with a servo motor), pneumatically, hydraulically, etc. Likewise, the pivot assembly 1307-2 may include stops that stop the rotation of the pivot assembly at desired positions (maneuverability configuration, efficiency configuration). In some implementations, the pivot assembly 1307 may include a dampener, electric brake or other inertial component to control a rate of rotation of the pivot assembly. Likewise, the dampener or other inertial component may be used to position the pivot assembly 1307 at other angles with respect to the frame 1304 of the aerial vehicle 1300.

In other implementations, the pivot assembly 1307-2 may include a locking pin that may be extended to engage with and lock the second pivot assembly 1307-2 into place with respect to the frame 1304 or retracted so that the pivot assembly 1307-2 can rotate about the frame 1304. In one implementation, when the pin is retracted, the rotational force from the rotation of the propeller blades of the third propulsion mechanism 1305-3 and/or the fourth propulsion mechanism 1305-4 cause the pivot assembly 1307-3 to rotate about the frame in a direction of the force. When the propulsion mechanism has reached a desired position, the pin is extended locking the rotation of the pivot assembly 1307-2, the third propulsion mechanism 1305-3 and the fourth propulsion mechanism 1305-4 into place with respect to the frame 1304.

FIG. 14 is an illustration of the aerial vehicle 1400 of FIG. 13 with the pivot assemblies 1407-1 and 1407-2 in an efficiency configuration, in accordance with described implementations. Except where otherwise noted, reference numerals preceded by the number "14" shown in FIG. 14 indicate components or features that are similar to components or features having reference numerals preceded by the number "13" shown in FIG. 13.

When the pivot assemblies 1407-1 and 1407-2 are rotated into the efficiency configuration, as illustrated in FIG. 14, the first propulsion mechanism 1405-1 and the third propulsion mechanism 1405-3 are aligned and the second propulsion mechanism 1405-2 and the fourth propulsion mechanism 1405-4 are aligned to form two columns, thereby reducing the profile of the aerial vehicle 1400. Likewise, the ducts 1409-1 and 1409-3 of the first propulsion mechanism 1405-1 and the third propulsion mechanism 1405-3 are aligned to form a column and the ducts 1409-3 and 1409-4 of the second propulsion mechanism 1405-2 and the fourth propulsion mechanism 1405-4 are aligned to form a column. Because the ducts 1409-1, 1409-2, 1409-3, and 1409-4 have an airfoil shape, when aligned in the two columns and the aerial vehicle 1400 is operating in a horizontal direction, the airflow passing over and through the ducts 1409 produces a vertical lift, thereby maintaining altitude of the aerial vehicle 1400 and improving the operating efficiency of the aerial vehicle 1400.

The aligned position of the propulsion mechanisms 1405, as illustrated in FIG. 14 to generate horizontal thrust and the lift produced from the airfoil shaped ducts, reduces the power required to propel the aerial vehicle 1400 during horizontal flight. Likewise, the rotation of the aerial vehicle toward a direction of travel in a horizontal direction, as illustrated in FIG. 14, reduces the drag and profile of the aerial vehicle that would result during horizontal flight if the propulsion mechanisms were not aligned and the aerial vehicle continued to operate in the maneuverability configuration illustrated with respect to FIG. 13. Specifically, if the propulsion mechanisms remained in the maneuverability configuration, drag would result from the ducts during horizontal flight. Likewise, to generate the necessary horizontal force to propel the aerial vehicle in a horizontal direction, the aerial vehicle would have to operate with a forward pitch, thereby increasing the profile of the aerial vehicle and the resulting drag. In comparison, by aligning the propulsion mechanisms 1405 with the pivot assemblies 1407 into the efficiency configuration and rotating the orientation of the aerial vehicle 1400, the drag from the ducts is converted into lift as the air passes over and through the airfoil shape of the ducts 1409. Likewise, because the aerial vehicle is rotated so that the propulsion mechanisms 1405 produce horizontal thrust, the aerial vehicle 1400 can navigate with less of a forward pitch, or no forward pitch, thereby reducing the profile of the aerial vehicle and resulting drag.

In addition to converting between an efficiency configuration and a maneuverability configuration, the implementations discussed with respect to at least FIGS. 11-14 provide redundancy in propulsion mechanism operation. For example, if one of the propulsion mechanism experiences an operational failure, the at least three other propulsion mechanisms of the aerial vehicle can continue operation and aerial navigation of the aerial vehicle.

While the implementations of the aerial vehicles discussed herein utilize propulsion mechanisms in the form of propellers, motors, and ducts, to achieve and maintain flight, in other implementations, the aerial vehicle may be configured in other manners. For example, the aerial vehicle may include fixed wings and/or a combination of both propulsion mechanisms and fixed wings.

Figure 15:
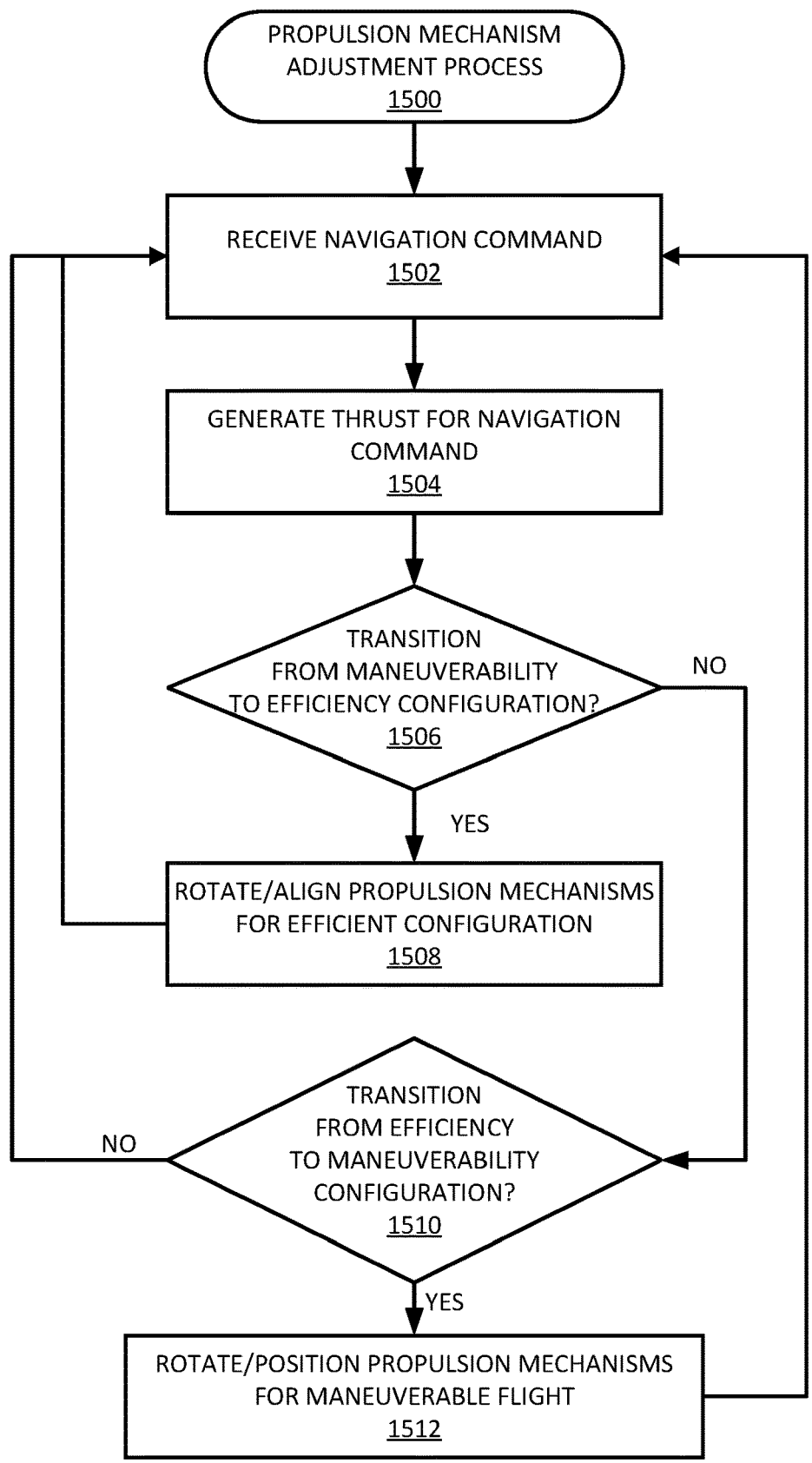
FIG. 15 is a flow diagram of an example pivot assembly adjustment process, in accordance with the described implementations.

FIG. 15 is a flow diagram of an example pivot assembly adjustment process 1500, in accordance with the described implementations. The example process begins upon receipt of a navigation command, as in 1502. The navigation command may be any form of received or determined navigation command. For example, the navigation command may be received from a remote computing resource, determined by the aerial vehicle as part of a process to navigate a flight path, etc.

In response to receiving the navigation command, the aerial vehicle generates thrust from each propulsion mechanism necessary to execute the received navigation command, as in 1504. For example, if the navigation command is a hover command, the thrusts generated by the propulsion mechanisms will be sufficient for the aerial vehicle to remain in a hover position at an existing altitude. In comparison, if the navigation command is to navigate in a direction that includes a substantially horizontal component, the thrust generated by the propulsion mechanisms will cause the aerial vehicle to pitch in the direction of travel and begin moving in the commanded horizontal direction.

In addition to generating thrusts sufficient to execute the navigation command, a determination is made as to whether the aerial vehicle is to transition from a maneuverability configuration to an efficiency configuration, as in 1506. As discussed above, when an aerial vehicle is in a maneuverability configuration, the propulsion mechanisms are separated, oriented to produce a vertical thrust, and the aerial vehicle is able to quickly maneuver in any direction. In comparison, when the aerial vehicle is in an efficiency configuration, the propulsion mechanisms are rotated to produce a horizontal thrust and/or are aligned to reduce a profile of the aerial vehicle.

It may be determined that the aerial vehicle is to transition into an efficiency configuration if, for example, the navigation command is a command to navigate in a substantially horizontal direction, if a flight path and/or navigation path specify that the aerial vehicle is to navigate in a substantially horizontal direction, no obstacles are detected, etc.

If it is determined that the aerial vehicle is to transition to an efficiency configuration, the pivot assemblies coupled to the respective propulsion mechanism are adjusted so that the propulsion mechanisms are aligned and/or oriented in a horizontal direction to generate a horizontal thrust, as in 1508. Alternatively, or in addition thereto, the aerial vehicle may be rotated so that the propulsion mechanisms are oriented in a horizontal direction to generate a horizontal thrust.

If it is determined that the propulsion mechanisms are not to be transitioned to the efficiency configuration, a determination is made as to whether the aerial vehicle is to be transitioned into the maneuverability configuration, as in 1510. It may be determined that the aerial vehicle is to transition into a maneuverability configuration if, for example, the navigation command is a command to navigate in a vertical direction, if a flight path and/or navigation path specify that the aerial vehicle is to land, ascend, descend, if an object is detected within a distance of the aerial vehicle, etc.

If it is determined that the aerial vehicle is to be transitioned to a maneuverability configuration, the pivot assemblies coupled to the respective propulsion mechanism are adjusted so that the propulsion mechanisms are separated and/or oriented in a direction to generate a vertical thrust, as in 1512. Alternatively, or in addition thereto, the aerial vehicle may be rotated so that the propulsion mechanisms are oriented in a vertical direction to generate a vertical thrust.

If it is determined that the aerial vehicle is not to be reconfigured (decision block 1510) and/or after transitioning the aerial vehicle into either an efficiency configuration (block 1508) or transitioning the aerial vehicle into a maneuverability configuration (block 1512), the example process 1500 returns to block 1502 and continues. The example process 1500 may continue during aerial navigation of the aerial vehicle.

Figure 16:
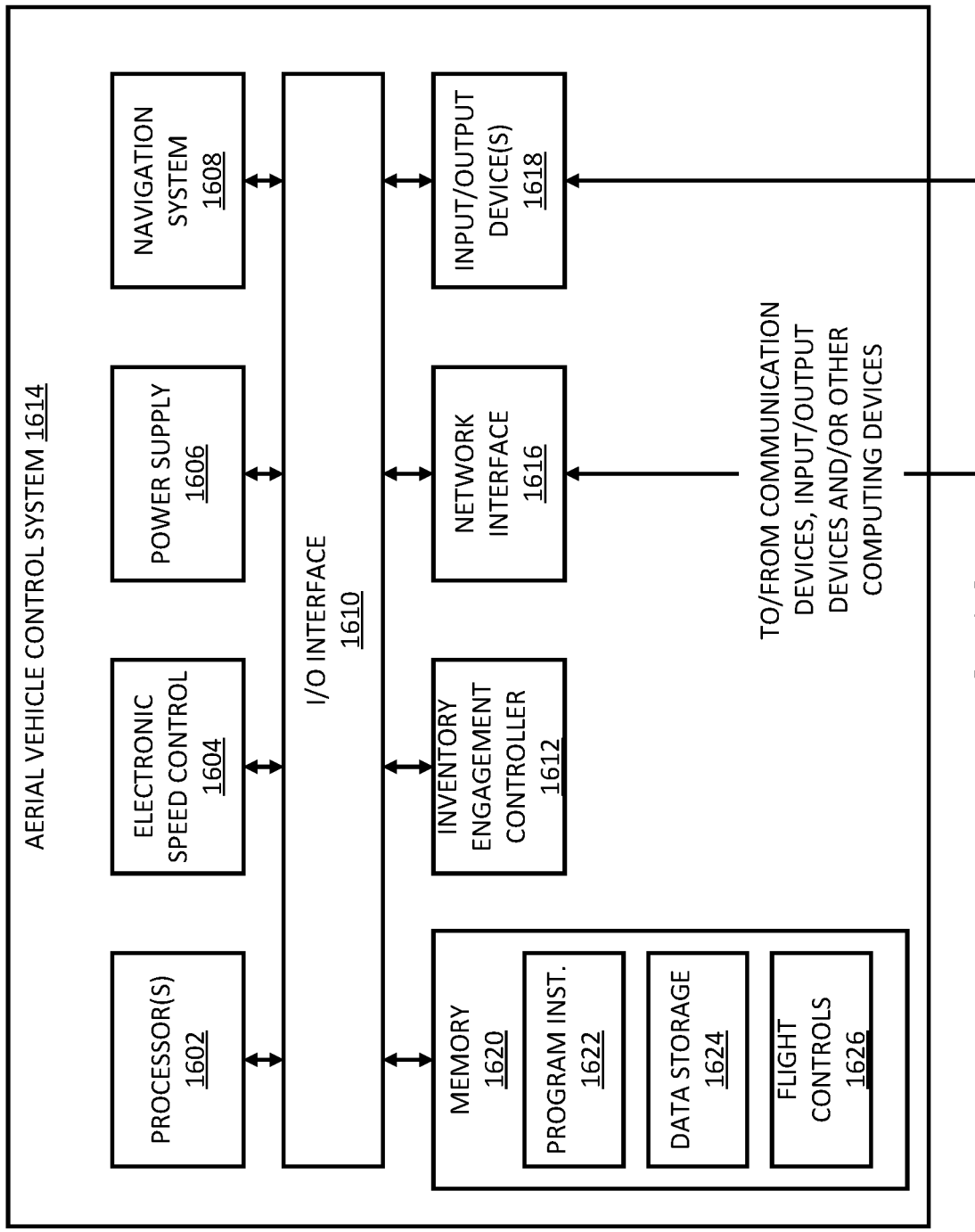
FIG. 16 is a block diagram of an illustrative implementation of an aerial vehicle control system, in accordance with described implementations.

FIG. 16 is a block diagram illustrating an example aerial vehicle control system 1614 of an aerial vehicle, such as a UAV. In various examples, the block diagram may be illustrative of one or more aspects of the aerial vehicle control system 1614 that may be used to implement the various systems and methods discussed herein and/or to control operation of an aerial vehicle. In the illustrated implementation, the aerial vehicle control system 1614 includes one or more processors 1602, coupled to a memory, e.g., a non-transitory computer readable storage medium 1620, via an input/output (I/O) interface 1610. The aerial vehicle control system 1614 may also include electronic speed controls 1604 (ESCs), power supply modules 1606 and/or a navigation system 1608. The aerial vehicle control system 1614 further includes a payload engagement controller 1612, a network interface 1616, and one or more input/output devices 1618.

In various implementations, the aerial vehicle control system 1614 may be a uniprocessor system including one processor 1602, or a multiprocessor system including several processors 1602 (e.g., two, four, eight, or another suitable number). The processor(s) 1602 may be any suitable processor capable of executing instructions. For example, in various implementations, the processor(s) 1602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1602 may commonly, but not necessarily, implement the same ISA.

The non-transitory computer readable storage medium 1620 may be configured to store executable instructions, data, flight paths, flight control parameters, pivot assemblies, and/or data items accessible by the processor(s) 1602. In various implementations, the non-transitory computer readable storage medium 1620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1620 as program instructions 1622, data storage 1624 and flight controls 1626, respectively. In other implementations, program instructions, data and/or flight controls may be received, sent or stored upon different types of computer-accessible media, such as non-transitory media, or on similar media separate from the non-transitory computer readable storage medium 1620 or the aerial vehicle control system 1614. Generally speaking, a non-transitory, computer readable storage medium may include storage media or memory media such as magnetic or optical media, e.g., disk or CD/DVD-ROM, coupled to the aerial vehicle control system 1614 via the I/O interface 1610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1616.

In one implementation, the I/O interface 1610 may be configured to coordinate I/O traffic between the processor(s) 1602, the non-transitory computer readable storage medium 1620, and any peripheral devices, the network interface or other peripheral interfaces, such as input/output devices 1618. In some implementations, the I/O interface 1610 may perform any necessary protocol, timing or other data transformations to convert data signals from one component (e.g., non-transitory computer readable storage medium 1620) into a format suitable for use by another component (e.g., processor(s) 1602). In some implementations, the I/O interface 1610 may include support for devices attached through various types of peripheral buses, such as a variant of the Peripheral Component Interconnect (PCI) bus standard or the Universal Serial Bus (USB) standard, for example. In some implementations, the function of the I/O interface 1610 may be split into two or more separate components, such as a north bridge and a south bridge, for example. Also, in some implementations, some or all of the functionality of the I/O interface 1610, such as an interface to the non-transitory computer readable storage medium 1620, may be incorporated directly into the processor(s) 1602.

The ESCs 1604 communicate with the navigation system 1608 and adjust the rotational speed of each lifting motor and/or the thrusting motor to stabilize the aerial vehicle, guide the aerial vehicle along a determined flight path and/or cause rotation of the pivot assembly from a maneuverability configuration to an efficiency configuration or from an efficiency configuration to a maneuverability configuration.

The navigation system 1608 may include a global positioning system (GPS), indoor positioning system (IPS), or other similar system and/or sensors that can be used to navigate the aerial vehicle to and/or from a location. The payload engagement controller 1612 communicates with the actuator(s) or motor(s) (e.g., a servo motor) used to engage and/or disengage items.

The network interface 1616 may be configured to allow data to be exchanged between the aerial vehicle control system 1614, other devices attached to a network, such as other computer systems (e.g., remote computing resources), and/or with aerial vehicle control systems of other aerial vehicles. For example, the network interface 1616 may enable wireless communication between the aerial vehicle and an aerial vehicle control system that is implemented on one or more remote computing resources. For wireless communication, an antenna of an aerial vehicle or other communication components may be utilized. As another example, the network interface 1616 may enable wireless communication between numerous aerial vehicles. In various implementations, the network interface 1616 may support communication via wireless general data networks, such as a Wi-Fi network. For example, the network interface 1616 may support communication via telecommunications networks, such as cellular communication networks, satellite networks, and the like.

Input/output devices 1618 may, in some implementations, include one or more displays, imaging devices, thermal sensors, infrared sensors, time of flight sensors, accelerometers, pressure sensors, weather sensors, etc. Multiple input/output devices 1618 may be present and controlled by the aerial vehicle control system 1614. One or more of these sensors may be utilized to assist in landing as well as to avoid obstacles during flight.

As shown in FIG. 16, the memory may include program instructions 1622, which may be configured to implement the example routines and/or sub-routines described herein. The data storage 1624 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1614 is merely illustrative and is not intended to limit the scope of the present disclosure. In particular, the computing system and devices may include any combination of hardware or software that can perform the indicated functions. The aerial vehicle control system 1614 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1614. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1614 may be transmitted to the aerial vehicle control system 1614 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other aerial vehicle control system configurations.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 15, orders in which such methods or processes are presented are not intended to be construed as any limitation on the claims, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle, comprising:
   a frame having a substantially cylindrical shape and defining a longitudinal axis of the aerial vehicle;
   a plurality of pivot assemblies, each pivot assembly coupled to and rotatable around the substantially cylindrical shape of the frame;
   a plurality of propulsion mechanisms, each propulsion mechanism coupled to a respective one of the plurality of pivot assemblies to be movable by the respective one of the plurality of pivot assemblies between a maneuverability configuration and an efficiency configuration; and
   wherein:
     the plurality of propulsion mechanisms are in the efficiency configuration when the plurality of propulsion mechanisms are substantially aligned such that each of the plurality of propulsion mechanisms has a common axis of rotation that is substantially parallel to the longitudinal axis of the aerial vehicle; and
     the plurality of propulsion mechanisms are in the maneuverability configuration when the plurality of propulsion mechanisms are not substantially aligned.

2. The aerial vehicle of claim 1, wherein at least one of the plurality of propulsion mechanisms includes:
   a motor;
   a propeller coupled to and rotatable by the motor; and
   a duct that surrounds the motor and the propeller forming a ducted propulsion mechanism.

3. The aerial vehicle of claim 1, wherein:
   the plurality of pivot assemblies includes a first pivot assembly, a second pivot assembly, and a third pivot assembly, each of the first pivot assembly, the second pivot assembly, and the third pivot assembly being coupled to and rotatable around the substantially cylindrical shape of the frame;
   the plurality of propulsion mechanisms includes a first propulsion mechanism coupled to the first pivot assembly, a second propulsion mechanism coupled to the second pivot assembly, and a third propulsion mechanism coupled to the third pivot assembly, the first propulsion mechanism being movable by the first pivot assembly between the maneuverability configuration and the efficiency configuration, the second propulsion mechanism being movable by the second pivot assembly between the maneuverability configuration and the efficiency configuration, and the third propulsion mechanism being movable by the third pivot assembly between the maneuverability configuration and the efficiency configuration; and
   wherein:
     the first propulsion mechanism, the second propulsion mechanism, and the third propulsion mechanism are in the efficiency configuration when the first propulsion mechanism, the second propulsion mechanism, and the third propulsion mechanism are substantially aligned such that the first propulsion mechanism, the second propulsion mechanism, and the third propulsion mechanism have the common axis of rotation that is substantially parallel to the longitudinal axis of the aerial vehicle; and
     the first propulsion mechanism, the second propulsion mechanism, and the third propulsion mechanism are in the maneuverability configuration when the first propulsion mechanism, the second propulsion mechanism, and the third propulsion mechanism are not substantially aligned.

4. The aerial vehicle of claim 3, wherein:
   the plurality of pivot assemblies includes a fourth pivot assembly coupled to and rotatable around the substantially cylindrical shape of the frame and adjacent the third pivot assembly;
   the plurality of propulsion mechanisms includes a fourth propulsion mechanism coupled to the fourth pivot assembly, the fourth propulsion mechanism being movable by the fourth pivot assembly between the maneuverability configuration and the efficiency configuration; and
   wherein:
     the first propulsion mechanism, the second propulsion mechanism, the third propulsion mechanism, and the fourth propulsion mechanism are in the efficiency configuration when the first propulsion mechanism, the second propulsion mechanism, the third propulsion mechanism, and the fourth propulsion mechanism are substantially aligned such that the first propulsion mechanism, the second propulsion mechanism, the third propulsion mechanism, and the fourth propulsion mechanism have the common axis of rotation that is substantially parallel to the longitudinal axis of the aerial vehicle; and
     the first propulsion mechanism, the second propulsion mechanism, the third propulsion mechanism, and the fourth propulsion mechanism are in the maneuverability configuration when the first propulsion mechanism, the second propulsion mechanism, the third propulsion mechanism, and the fourth propulsion mechanism are not substantially aligned.

5. The aerial vehicle of claim 1, further comprising:
   an aerial vehicle control system including a processor and program instructions that when executed by the processor cause the processor to at least:
     determine that the aerial vehicle is to transition from the maneuverability configuration to the efficiency configuration;
     send instructions to at least one of the plurality of pivot assemblies to cause the at least one of the plurality of pivot assemblies to rotate about the substantially cylindrical shape of the frame such that the plurality of propulsion mechanisms are substantially aligned; and
     cause the aerial vehicle to navigate in a substantially horizontal direction.

6. The aerial vehicle of claim 1, further comprising:
   a retractable pin movable between an extended position and a retracted position; and
   wherein:
     when the retractable pin is in the extended position, at least one of the plurality of pivot assemblies is in a fixed position with respect to the frame; and
     when the retractable pin is in the retracted position, the at least one of the plurality of pivot assemblies is able to rotate about the substantially cylindrical shape of the frame.

7. The aerial vehicle of claim 1, wherein at least one of the plurality of pivot assemblies is adjustable about the substantially cylindrical shape of the frame using at least one of a motor, hydraulics, pneumatics, or a force produced by the at least one of the plurality of pivot assemblies.

8. The aerial vehicle of claim 1, further comprising:
a payload engagement member configured to selectively engage and disengage a payload.

9. The aerial vehicle of claim 1, wherein in the maneuverability configuration, the plurality of propulsion mechanisms do not overlap.

10. The aerial vehicle of claim 1, wherein at least one of the plurality of pivot assemblies includes a plurality of stops configured to secure the at least one of the plurality of pivot assemblies in a plurality of corresponding positions.

11. The aerial vehicle of claim 1, wherein at least one of the plurality of pivot assemblies includes at least one of a dampener or electric brake configured to control a rate of rotation of at least one of the plurality of pivot assemblies.

12. An aerial vehicle, comprising:
a frame that defines a longitudinal axis of the aerial vehicle;
a plurality of pivot assemblies, each pivot assembly coupled to the frame and rotatable around the frame;
a plurality of propulsion mechanisms, each propulsion member coupled to and movable by a respective one of the plurality of pivot assemblies between at least a maneuverability configuration and an efficiency configuration;
wherein:
the plurality of propulsion mechanisms are in the efficiency configuration when the plurality of propulsion mechanisms are substantially aligned such that each of the plurality of propulsions mechanisms has a common axis of rotation that is substantially parallel to the longitudinal axis of the aerial vehicle; and
the plurality of propulsion mechanisms are in the maneuverability configuration when the plurality of propulsion mechanisms are not substantially aligned.

13. The aerial vehicle of claim 12, wherein the aerial vehicle is configured to aerially navigate in a direction that is substantially horizontal when the aerial vehicle is in the efficiency configuration.

14. The aerial vehicle of claim 12, wherein:
the plurality of pivot assemblies includes a first pivot assembly, a second pivot assembly, and a third pivot assembly;
the first pivot assembly is positioned at a front portion of the frame;
the second pivot assembly is positioned adjacent the first pivot assembly; and
the third pivot assembly is positioned adjacent the second pivot assembly.

15. The aerial vehicle of claim 12, wherein at least one of the plurality of propulsion mechanisms includes a duct.

16. The aerial vehicle of claim 12, further comprising:
the plurality of pivot assemblies a fourth pivot assembly coupled to the frame and rotatable around the frame; and
the plurality of propulsion mechanisms includes a fourth propulsion mechanism coupled to and rotatable by the fourth pivot assembly between at least the maneuverability configuration and the efficiency configuration.

17. A method of operating an aerial vehicle, comprising:
determining that the aerial vehicle is to transition from a maneuverability configuration to an efficiency configuration;
causing at least one of a plurality of pivot assemblies to rotate about a substantially cylindrical frame so that a plurality of propulsion mechanisms coupled to the plurality of pivot assemblies are substantially aligned such that each of the plurality of propulsions mechanisms has a common axis of rotation that is substantially parallel to a longitudinal axis of the aerial vehicle;
determining that the aerial vehicle is to transition from the efficiency configuration to the maneuverability configuration; and
causing at least one of the plurality of pivot assemblies to rotate about the substantially cylindrical frame so that the plurality of propulsion mechanisms coupled to the plurality of pivot assemblies are not substantially aligned.

18. The method of claim 17,
wherein the plurality of pivot assemblies includes a first pivot assembly, a second pivot assembly, a third pivot assembly, and a fourth pivot assembly, and
wherein the plurality of propulsion mechanisms includes a first propulsion mechanism, a second propulsion mechanism, a third propulsion mechanism, and a fourth propulsion mechanism,
the method further comprising:
upon determining that the aerial vehicle is to transition from the maneuverability configuration to the efficiency configuration, causing at least one of the first pivot assembly, the second pivot assembly, the third pivot assembly, or the fourth pivot assembly to rotate about the substantially cylindrical frame so that the first propulsion mechanism coupled to the first pivot assembly, the second propulsion mechanism coupled to the second pivot assembly, the third propulsion mechanism coupled to the third pivot assembly, and the fourth propulsion mechanism coupled to the fourth pivot assembly are substantially aligned such that the first propulsion mechanism, the second propulsion mechanism, the third propulsion mechanism, and the fourth propulsion mechanism have the common axis of rotation that is substantially parallel to the longitudinal axis of the aerial vehicle; and
upon determining that the aerial vehicle is to transition from the efficiency configuration to the maneuverability configuration, causing at least one of the first pivot assembly, the second pivot assembly, the third pivot assembly, or the fourth pivot assembly to rotate about the substantially cylindrical frame so that the first propulsion mechanism coupled to the first pivot assembly, the second propulsion mechanism coupled to the second pivot assembly, the third propulsion mechanism coupled to the third pivot assembly, and the fourth propulsion mechanism coupled to the fourth pivot assembly are substantially not aligned.

19. The method of claim 17, further comprising selectively engaging and disengaging a payload.

* * * * *